US011523343B2

(12) United States Patent
Sarkis et al.

(10) Patent No.: US 11,523,343 B2
(45) Date of Patent: Dec. 6, 2022

(54) MONITORING WAKE-UP SIGNAL USING COMMON IDENTIFIER

(71) Applicant: QUALCOMM Incorporated, San Diego, CA (US)

(72) Inventors: Gabi Sarkis, San Diego, CA (US); Peter Pui Lok Ang, San Diego, CA (US); Huilin Xu, San Diego, CA (US); Wooseok Nam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/800,935

(22) Filed: Feb. 25, 2020

(65) Prior Publication Data

US 2020/0314755 A1 Oct. 1, 2020

Related U.S. Application Data

(60) Provisional application No. 62/826,760, filed on Mar. 29, 2019.

(51) Int. Cl.
*H04W 52/02* (2009.01)
*H04L 5/00* (2006.01)
*H04W 72/04* (2009.01)

(52) U.S. Cl.
CPC ....... *H04W 52/0235* (2013.01); *H04L 5/0048* (2013.01); *H04W 72/042* (2013.01)

(58) Field of Classification Search
None
See application file for complete search history.

(56) References Cited

U.S. PATENT DOCUMENTS

| 2012/0275365 | A1* | 11/2012 | Anderson | H04W 52/0219 370/311 |
|---|---|---|---|---|
| 2016/0345294 | A1 | 11/2016 | Bennett et al. | |
| 2019/0059129 | A1 | 2/2019 | Luo et al. | |
| 2019/0297577 | A1* | 9/2019 | Lin | H04W 52/0229 |

(Continued)

FOREIGN PATENT DOCUMENTS

| EP | 2621242 A1 | 7/2013 |
|---|---|---|
| WO | WO-2018204799 A1 | 11/2018 |

(Continued)

OTHER PUBLICATIONS

International Search Report and Written Opinion—PCT/US2020/019889—ISAEPO—dated May 27, 2020.

(Continued)

*Primary Examiner* — Christine T Duong
(74) *Attorney, Agent, or Firm* — Qualcomm Incorporated

(57) ABSTRACT

Methods, systems, and devices for wireless communications are described. According to one or more aspects, a user equipment (UE) may receive a configuration message from a base station. The configuration message may configure the UE based on one or more identifiers associated with a group of UEs. The UE may determine at least one identifier based on receiving the configuration message, and may monitor a signal based on the at least one identifier. In some cases, the signal may indicate whether the UE should skip an upcoming duration associated with a discontinuous reception. The UE may then communicate with the base station, based on monitoring the signal.

28 Claims, 16 Drawing Sheets

(56) References Cited

U.S. PATENT DOCUMENTS

| | | | |
|---|---|---|---|
| 2019/0306827 A1* | 10/2019 | Agiwal | H04W 68/02 |
| 2020/0037247 A1 | 1/2020 | Liao et al. | |
| 2020/0059862 A1* | 2/2020 | Wong | H04W 52/028 |
| 2020/0100179 A1* | 3/2020 | Zhou | G06F 1/3209 |
| 2020/0145921 A1* | 5/2020 | Zhang | H04W 56/001 |
| 2020/0314811 A1 | 10/2020 | Lin et al. | |

FOREIGN PATENT DOCUMENTS

| | | |
|---|---|---|
| WO | WO-2019028825 A1 | 2/2019 |
| WO | WO-2020204804 A1 | 10/2020 |

OTHER PUBLICATIONS

Qualcomm Incorporated, et al., "Wake-up Signaling for C-DRX Mode", 3GPP Draft, 3GPP TSG RAN WG2 NR #99, R2-1709652 Wake-up Signaling for C-DRX Mode, 3rd Generation Partnership Project (3GPP), Mobile Competence Centre, 650, Route Des Lucioles, F-06921, Sophia-Antipolis Cedex, France, vol. RAN WG2, No. Berlin, Germany, Aug. 21, 2017-Aug. 25, 2017, Aug. 20, 2017, XP051319364, 6 pages, Retrieved from the Internet: URL: http://www.3gpp.org/ftp/Meetings_3GPP_SYNC/RAN2/Docs/, [retrieved on Aug. 20, 2017].

* cited by examiner

MONITORING WAKE-UP SIGNAL USING COMMON IDENTIFIER

CROSS REFERENCE

The present Application for Patent claims the benefit of U.S. Provisional Patent Application No. 62/826,760 by SARKIS et al., entitled "MONITORING WAKE-UP SIGNAL USING COMMON IDENTIFIER," filed Mar. 29, 2019, assigned to the assignee hereof, and expressly incorporated herein.

BACKGROUND

The following relates generally to wireless communications, and more specifically to monitoring wake-up signal using common identifier.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as a user equipment (UE). Some wireless communications systems may support UEs operating in a discontinuous reception (DRX) mode. UEs operating in a DRX mode may transition between a sleep state for power conservation and an active state for data transmission and reception (during an ON duration) according to a wake-up signal. Conventional techniques for transmitting wake-up signals in a DRX mode, however, may be improved.

SUMMARY

The described techniques relate to improved methods, systems, devices, and apparatuses that support monitoring wake-up signal using common identifier. Generally, the described techniques provide for techniques where a base station configures a group of UEs with one or more identifiers (such as a common identifier, a UE-specific identifier, or both). In some cases, the base station may configure the groups of UEs using higher layer signaling message. When operating in a DRX mode (e.g., a connected DRX (C-DRX) mode), the group of UEs may monitor wake-up signals according to the one or more identifiers. If the UEs receive a wake-up signal that is associated with the one or more identifiers, then UEs may determine that the wake-up signal is intended for the UEs. In some cases, a UE may determine that it is configured with the common identifier, and may monitor the wake-up signal based on the common identifier. Additionally or alternatively, a UE may determine that it is not configured with the common identifier, and may monitor the wake-up signal based on a UE-specific identifier. Upon detecting the wake-up signal, the UEs may initiate a wake-up procedure and transition to an active mode for data transmission and reception.

A method of wireless communication at a UE is described. The method may include receiving, from a base station, a configuration message that includes one or more identifiers associated with a group of UEs, determining at least one identifier based on receiving the configuration message, monitoring a signal based on the at least one identifier, where the signal indicates whether to skip an upcoming duration associated with a discontinuous reception, and communicating, with the base station, based on monitoring the signal.

An apparatus for wireless communication at a UE is described. The apparatus may include a processor, memory in electronic communication with the processor, and instructions stored in the memory. The instructions may be executable by the processor to cause the apparatus to receive, from a base station, a configuration message that includes one or more identifiers associated with a group of UEs, determine at least one identifier based on receiving the configuration message, monitor a signal based on the at least one identifier, where the signal indicates whether to skip an upcoming duration associated with a discontinuous reception, and communicate, with the base station, based on monitoring the signal.

Another apparatus for wireless communication at a UE is described. The apparatus may include means for receiving, from a base station, a configuration message that includes one or more identifiers associated with a group of UEs, determining at least one identifier based on receiving the configuration message, monitoring a signal based on the at least one identifier, where the signal indicates whether to skip an upcoming duration associated with a discontinuous reception, and communicating, with the base station, based on monitoring the signal.

A non-transitory computer-readable medium storing code for wireless communication at a UE is described. The code may include instructions executable by a processor to receive, from a base station, a configuration message that includes one or more identifiers associated with a group of UEs, determine at least one identifier based on receiving the configuration message, monitor a signal based on the at least one identifier, where the signal indicates whether to skip an upcoming duration associated with a discontinuous reception, and communicate, with the base station, based on monitoring the signal.

Some examples of the method, apparatuses, and non-transitory computer-readable medium described herein may further include operations, features, means, or instructions for determining that a cyclic redundancy check (CRC) in a downlink control information (DCI) associated with the signal may be scrambled using the at least one identifier, where monitoring the signal may be based on the determining.

In some examples of the method, apparatuses, and non-transitory computer-readable medium described herein, the at least one identifier may be a wake-up signal radio network temporary identifier (RNTI), where monitoring the signal further includes monitoring a wake-up signal based on the wake-up signal RNTI. In some examples of the method, apparatuses, and non-transitory computer-readable medium described herein, the wake-up signal RNTI may be same for the group of UEs.

In some examples of the method, apparatuses, and non-transitory computer-readable medium described herein, the at least one identifier may be a cell RNTI (C-RNTI), where monitoring the signal further includes monitoring a wake-up signal based on the C-RNTI. In some examples of the method, apparatuses, and non-transitory computer-readable medium described herein, the C-RNTI may be uniquely associated with the UE.

Some examples of the method, apparatuses, and non-transitory computer-readable medium described herein may further include operations, features, means, or instructions for determining that the UE may be not configured with a first indicator based on the configuration message, where monitoring the signal further includes monitoring the signal based on a second identifier, and where the first identifier may be a wake-up signal RNTI and the second identifier may be a C-RNTI.

Some examples of the method, apparatuses, and non-transitory computer-readable medium described herein may further include operations, features, means, or instructions for determining a second identifier based on receiving the configuration message, where the at least one identifier may be a wake-up signal RNTI and the second identifier may be a C-RNTI. In some examples of the method, apparatuses, and non-transitory computer-readable medium described herein, monitoring the signal further may include operations, features, means, or instructions for monitoring a first wake-up signal based on the at least one identifier, and monitoring a second wake-up signal based on the second identifier.

Some examples of the method, apparatuses, and non-transitory computer-readable medium described herein may further include operations, features, means, or instructions for monitoring the first wake-up signal and the second wake-up signal occurs during a monitoring occasion. Some examples of the method, apparatuses, and non-transitory computer-readable medium described herein may further include operations, features, means, or instructions for monitoring the first wake-up signal and the second wake-up signal occurs during different monitoring occasions.

In some examples of the method, apparatuses, and non-transitory computer-readable medium described herein, determining at least one identifier further may include operations, features, means, or instructions for receiving a DCI associated with the signal, analyzing content of the DCI to identify a bit mask associated with one or more intended recipients of the signal.

In some examples of the method, apparatuses, and non-transitory computer-readable medium described herein, the bit mask indicates whether to skip the upcoming duration associated with the discontinuous reception. In some cases, monitoring a signal may be based on the bit mask.

Some examples of the method, apparatuses, and non-transitory computer-readable medium described herein may further include operations, features, means, or instructions for determining whether to monitor a second signal based on the bit mask, where monitoring the second signal may be based on determining that the UE may be included in the one or more intended recipients.

Some examples of the method, apparatuses, and non-transitory computer-readable medium described herein may further include operations, features, means, or instructions for determining a demodulation reference signal (DMRS) scrambling seed associated with the signal, where monitoring the signal may be based on determining the DMRS scrambling seed. In some examples of the method, apparatuses, and non-transitory computer-readable medium described herein, the signal may be a physical downlink control channel (PDCCH)-based wake-up signal.

In some examples of the method, apparatuses, and non-transitory computer-readable medium described herein, the configuration message may be a RRC configuration message. In some examples of the method, apparatuses, and non-transitory computer-readable medium described herein, the group of UEs include one or more UEs.

A method of wireless communication at a base station is described. The method may include transmitting, to a UE, a configuration message that includes one or more identifiers associated with a group of UEs, configuring the UE with at least one identifier based on transmitting the configuration message, transmitting a signal based on the at least one identifier, where the signal indicates whether to skip an upcoming duration associated with a discontinuous reception, and communicating, with the UE, based on the signal.

An apparatus for wireless communication at a base station is described. The apparatus may include a processor, memory in electronic communication with the processor, and instructions stored in the memory. The instructions may be executable by the processor to cause the apparatus to transmit, to a UE, a configuration message that includes one or more identifiers associated with a group of UEs, configure the UE with at least one identifier based on transmitting the configuration message, transmit a signal based on the at least one identifier, where the signal indicates whether to skip an upcoming duration associated with a discontinuous reception, and communicate, with the UE, based on the signal.

Another apparatus for wireless communication at a base station is described. The apparatus may include means for transmitting, to a UE, a configuration message that includes one or more identifiers associated with a group of UEs, configuring the UE with at least one identifier based on transmitting the configuration message, transmitting a signal based on the at least one identifier, where the signal indicates whether to skip an upcoming duration associated with a discontinuous reception, and communicating, with the UE, based on the signal.

A non-transitory computer-readable medium storing code for wireless communication at a base station is described. The code may include instructions executable by a processor to transmit, to a UE, a configuration message that includes one or more identifiers associated with a group of UEs, configure the UE with at least one identifier based on transmitting the configuration message, transmit a signal based on the at least one identifier, where the signal indicates whether to skip an upcoming duration associated with a discontinuous reception, and communicate, with the UE, based on the signal.

Some examples of the method, apparatuses, and non-transitory computer-readable medium described herein may further include operations, features, means, or instructions for scrambling, using the at least one identifier, a CRC in a DCI associated with the signal, where transmitting the signal further including transmitting the signal including the scrambled CRC.

In some examples of the method, apparatuses, and non-transitory computer-readable medium described herein, the at least one identifier may be a wake-up signal RNTI, where transmitting the signal further includes transmitting a wake-up signal based on the wake-up signal RNTI. In some examples of the method, apparatuses, and non-transitory computer-readable medium described herein, the wake-up signal RNTI may be same for the group of UEs.

In some examples of the method, apparatuses, and non-transitory computer-readable medium described herein, the at least one identifier may be a C-RNTI, where transmitting the signal further includes transmitting a wake-up signal based on the C-RNTI. In some examples of the method, apparatuses, and non-transitory computer-readable medium described herein, the C-RNTI may be uniquely associated with the UE.

Some examples of the method, apparatuses, and non-transitory computer-readable medium described herein may further include operations, features, means, or instructions for configuring the UE with a second identifier based on transmitting the configuration message, where the at least one identifier may be a wake-up signal RNTI and the second identifier may be a C-RNTI.

In some examples of the method, apparatuses, and non-transitory computer-readable medium described herein, transmitting the signal further may include operations, features, means, or instructions for transmitting a first wake-up signal based on the at least one identifier, and transmitting a second wake-up signal based on the second identifier. In some examples of the method, apparatuses, and non-transitory computer-readable medium described herein, the signal may be a PDCCH-based wake-up signal.

In some examples of the method, apparatuses, and non-transitory computer-readable medium described herein, the configuration message may be a RRC configuration message. In some examples of the method, apparatuses, and non-transitory computer-readable medium described herein, the group of UEs includes one or more UEs.

DETAILED DESCRIPTION

Some wireless communications systems (e.g., millimeter wave (mmW) systems) may support UEs operating in a DRX mode (e.g., a C-DRX mode). A base station (e.g., eNodeB (eNB), a next-generation NodeB or giga-NodeB (either of which may be referred to as a gNB)) may serve a large number of UEs within a geographical location. In some examples, a base station may use PDCCH-based wake-up signals. In order to efficiently use wake-up signals, the base station may use common identifiers (such as wake-up signal RNTIs) to simultaneously wake up multiple UEs. In conventional systems, a UE may receive a PDCCH-based wake-up signal, where the DCI associated with the PDCCH-based wake-up signal is scrambled using a UE-specific identifier. Thus, the base station may scramble the DCI uniquely for each UE using UE-specific identifiers. In wireless communications systems where a base station serves a large number of UEs, such a technique for transmitting wake-up signals may unnecessarily increase the use of PDCCH resources at the base station. According to one or more aspects of the present disclosure, a group of UEs may be configured with one or more identifiers (such as a common identifier, a UE-specific identifier, or both). When in a DRX mode (such as a C-DRX mode), the group of UEs may monitor wake-up signals according to the one or more identifiers.

In some cases, if the UEs receive a wake-up signal that is associated with the one or more identifiers, then the UEs may determine that the wake-up signal is intended for the UEs. In one example, a UE may determine that it is configured with the common identifier (such as a wake-up signal RNTI), and may monitor the wake-up signal based on the common identifier. Additionally or alternatively, the UE may determine that it is not configured with the common identifier (such as a wake-up signal RNTI), and may monitor the wake-up signal based on the UE-specific identifier. Upon detecting the wake-up signal, the UEs may initiate a wake-up procedure and transition to an active mode for data transmission and reception. In this way, a common wake-up signal configuration (such as a wake-up signal RNTI or a power saving RNTI) may provide resource efficiency for base stations, and therefore benefit base stations with reduced overhead signaling. Additionally, the wake-up signal configuration (such as the use of wake-up signal RNTI) may provide power efficiencies to UEs, and therefore benefit the UEs with improved power savings.

Aspects of the disclosure are initially described in the context of a wireless communications system. Aspects of the disclosure are further illustrated by and described with reference to apparatus diagrams, system diagrams, and flowcharts that relate to monitoring wake-up signal using common identifier.

Figure 1:
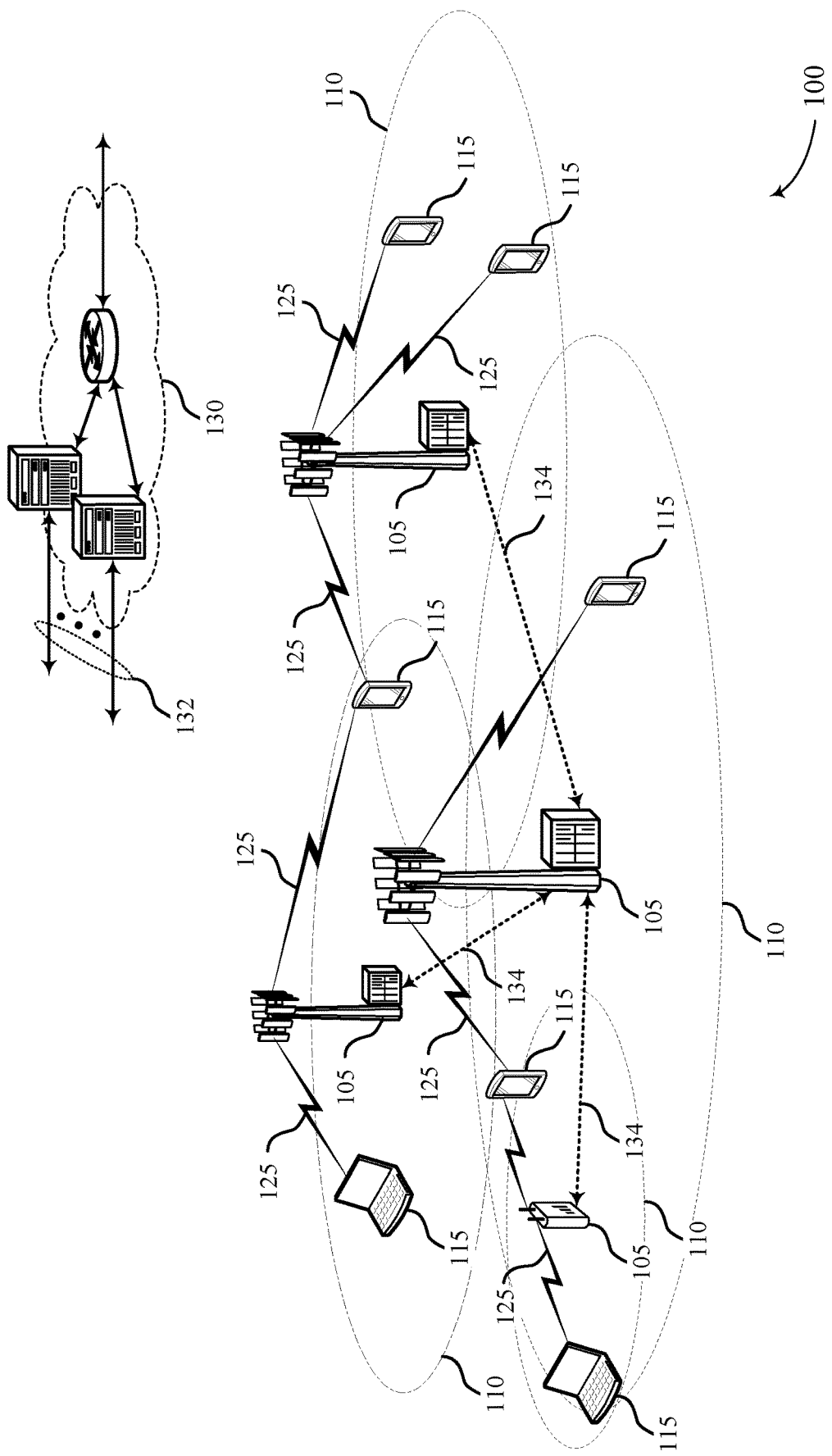
FIG. 1 illustrates an example of a system for wireless communications that supports monitoring wake-up signal using common identifier in accordance with aspects of the present disclosure.

FIG. 1 illustrates an example of a wireless communications system 100 that supports monitoring wake-up signal using common identifier in accordance with aspects of the present disclosure. The wireless communications system 100 includes base stations 105, UEs 115, and a core network 130. In some examples, the wireless communications system 100 may be an LTE network, an LTE-A network, an LTE-A Pro network, or an NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNB, a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. Additionally or alternatively, a UE 115 may be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support mmW communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a CRC), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-S-OFDM).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Some wireless communications systems 100 (e.g., mmW systems) may support UEs 115 operating in a DRX mode. In some cases, the wireless communications systems 100 may support UEs 115 operating in a C-DRX mode. In a DRX mode (such as a C-DRX mode), a UE 115 may switch between an active state for data transmission and reception and a sleep state for power saving. The UE 115 may determine if data is available by monitoring a control channel, such as a PDCCH. The PDCCH may carry or otherwise convey an indication that a base station 105 has data prepared to transmit to the UE 115 or is scheduling the UE 115 for data transmission. In some examples, base stations 105 may use a wake-up signal to convey an indication that the base stations 105 have data ready to transmit to the UEs 115. Additionally or alternatively, the base stations 105 may use a wake-up signal to convey an indication that the base stations 105 are scheduling the UEs 115 for data transmission. Examples of a wake-up signal may be a reference signal-type signals, such as a channel state information (CSI) reference signal (CSI-RS), or a tracking reference signal (TRS), or a DMRS, or a synchronization signal, or the like. In other examples, examples of wake-up signals may be PDDCH-type signals. In some examples, a wake-up signal may be scrambled according to a scrambling sequence, such as a pseudo-noise (PN) sequence, a Zadoff-Chu (ZC) sequence, or a Gold sequence, etc. In some examples, the base stations 105 may transmit a PDCCH-based wake-up signal with a DCI. In some cases, the DCI may be scrambled using a C-RNTI.

To reduce the frequency of control channel monitoring and improve power efficiency of the UE 115 during DRX operation (such as during a C-DRX mode), the UE 115 may monitor a wake-up signal while in a low power mode. For example, if the UE 115 receive (or detects) a wake-up signal transmitted by the base station 105, the UE 115 may transition to a higher power mode to monitor the control channel for scheduling information. However, if the UE 115 does not receive (or detect) a wake-up signal transmitted by the base station 105, the UE 115 may skip an upcoming duration (such as skip a control channel monitoring opportunity) associated with the DRX operation, and instead return to a deep sleep mode. Thus, wake-up signals may enable the UE 115 to reduce occasions of having to unnecessarily wake-up (e.g., when no data transmissions are scheduled during a duration (e.g., an ON duration) associated with an active state), improving the power savings at the UE 115. In conventional systems, a UE 115 may receive a PDCCH-based wake-up signal with the DCI scrambled using a C-RNTI. Upon receiving the PDCCH-based wake-up signal, the UE 115 may identify the PDCCH-based wake-up signal by determining that a CRC in the DCI is scrambled using the C-RNTI. A C-RNTI may be uniquely associated with a UE 115. However, in wireless communications systems where a base station 105 serves a large number of UEs 115, the base station 105 may transmit a PDCCH-based wake-up signal for each UE 115. This may unnecessarily increase the use of PDCCH resources at the base station 105 and thus, efficient wake-up signal transmission techniques may be desired.

As previously discussed, a base station 105 may serve a large number of UEs 115 within a geographic coverage area. In order to resourcefully use wake-up signals, the base station 105 may use a common identifier for the wake-up signals intended for each UE 115 or group of UEs 115. Each UE 115 or a group of UEs 115 may be configured with the common identifier (such as a common RNTI or a wake-up signal RNTI) based in part on a configuration message (such as an RRC configuration). In some examples, the configuration message may be specific to each UE 115 or may be common for a group of UEs 115. In one example, a UE 115 may receive a configuration message (such as an RRC configuration message) from the base station 105. In one example, the RRC configuration message may include one or more identifiers associated with a group of UEs 115. For example, the RRC configuration message may configure multiple UEs 115 (or a single UE 115) with a common identifier (such as a wake-up signal RNTI). If the UE 115 determines that it is configured with a common identifier (such as a wake-up signal RNTI), then the UE 115 may monitor wake-up signals based on the common identifier (such as a wake-up signal RNTI). In some cases, the base station 105 may configure multiple UEs 115 to monitor wake-up signals based on the same wake-up signal RNTI. That is, instead of dedicating a C-RNTI for each UE 115, the base station 105 may use a common identifier (such as a wake-up signal RNTI) to configure multiple UEs 115 to monitor wake-up signals. Thus, a common wake-up signal configuration (such as a wake-up signal RNTI) may provide resource efficiency for base stations 105, and therefore benefit base stations 105 with reduced overhead signaling. Additionally, the wake-up signal configuration (such as the use of wake-up signal RNTI) may provide power efficiencies to UEs 115, and therefore benefit UEs 115 with improved power savings.

Base stations 105 may transmit configuration message to configure UEs 115 with one or more identifiers. In one example, a base station 105 may configure multiple UEs 115 with a common identifier (such as a wake-up signal RNTI). In one example, the base station 105 may configure each UE 115 with a UE-specific RNTI (such as a C-RNTI). In some cases, the base station 105 may configure each UE 115 with a C-RNTI, a wake-up signal RNTI, or both. According to one or more aspects of the present disclosure, after configuring a group of UEs 115, the base station 105 may transmit a signal based on the at least one identifier. For example, the base station 105 may transmit a wake-up signal (such as a PDCCH-based wake-up signal) to a UE 115 or a group of UEs 115. In one example, a base station 105 may transmit a configuration to a UE 115 via higher-layer signaling (e.g., RRC signaling) to configure the UE 115 with the common identifier, the UE-specific RNTI, or both. Each UE 115 may be configured with a configuration that indicates how the UE 115 monitors for wake-up signals, decodes wake-up signals, and the like. In one example, where the base station 105 configures multiple UEs 115 with a common identifier (such as a wake-up signal RNTI), the base station 105 may transmit the wake-up signal based on the wake-up signal RNTI. In some examples, where the base station 105 configures multiple UEs 115 with a common identifier (such as a wake-up signal RNTI), the base station 105 may transmit multiple wake-up signals scrambled with a common wake-up signal RNTI. In some cases, the wake-up signal may inform the UE 115 whether to skip an upcoming ON duration associated with a DRX operation. In some examples, the wake-up signal may inform multiple UEs 115 whether to skip an upcoming ON duration associated with a DRX operation. The ON durations associated with multiple UEs 115 may or may not be aligned. Accordingly, by using a common identifier for wake-up signals for different UEs 115, the wireless communications system 100 may support improved power savings at the UEs 115, as well as provide for increased savings on resources.

Figure 2:
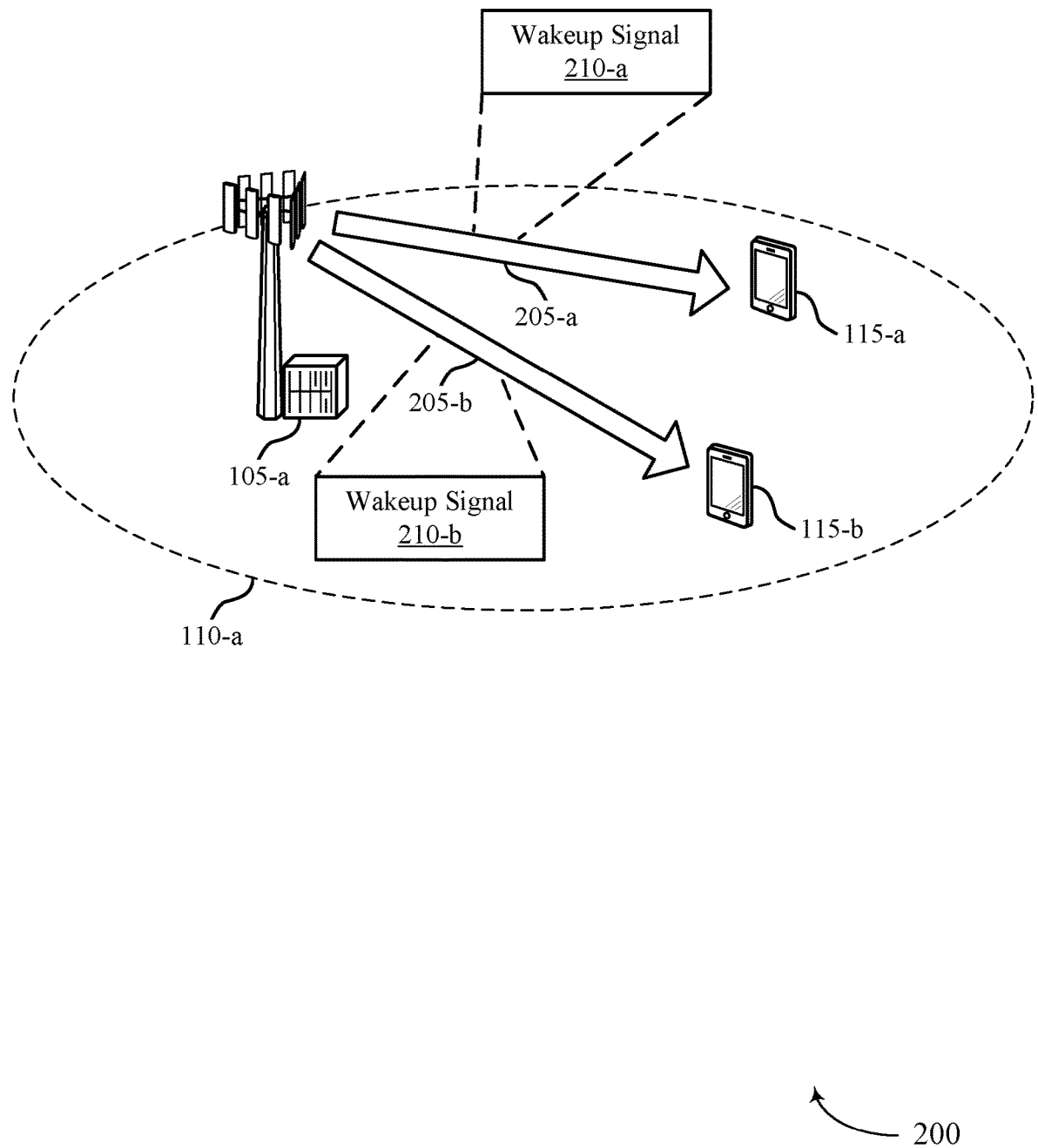
FIG. 2 illustrates an example of a wireless communications system that supports monitoring wake-up signal using common identifier in accordance with aspects of the present disclosure.

FIG. 2 illustrates an example of a wireless communications system 200 that supports monitoring wake-up signal using common identifier in accordance with aspects of the present disclosure. In some examples, the wireless communications system 200 may implement aspects of the wireless communications system 100. For example, the wireless communications system 200 may include a base station 105-a, a UE 115-a, and a UE 115-b, which may be examples of the corresponding devices described with reference to FIG. 1. Some examples of the wireless communications system 200 may support an improved wake-up signaling procedures for DRX operation. In some cases, the UEs 115 may support monitoring a wake-up signal using common identifier for improved power efficiency.

In conventional wireless communications system, a DRX mode of operation may span the time period between consecutive "ON" states. A UE 115 may determine if data is available by monitoring a control channel, such as a PDCCH. The PDCCH may carry or otherwise convey an indication that a base station has data ready to transmit to the UE. A base stations 105-a may use a wake-up signal to convey an indication that the base station 105-a are scheduling the UEs 115 for data transmission. For example, a UE 115 may operate in a low power mode until signaled, via a wake-up signal 210, to transition into a higher power mode to support data transmission and reception.

The base station 105-a may provide a network coverage for UEs 115 within geographic coverage area 110-a. In some examples, UEs 115 may support DRX operation with wake-up signals 210 for improved power efficiency. These wake-up signals 210 may be examples of reference signal-type signals or PDCCH-type signals. UEs 115 (e.g., the UE 115-a and the UE 115-b) may be configured with a common identifier (such as a wake-up signal RNTI) to monitor different wake-up signals 210 transmitted by the base station 105-a. In some examples, the wake-up signal RNTI may also be referred to as a power-saving RNTI.

In the wireless communications system 200 (e.g., mmW system supporting beamforming), the base station 105-a may transmit wake-up signals 210. For example, the base station 105-a may transmit wake-up signals 210 on a downlink channel 205 (e.g., a downlink control channel). In one example, the base station 105-a may transmit the wake-up signals 210 using a number of different downlink transmit beams (not shown). The base station 105-a may transmit the wake-up signaling to improve the reception reliability at the UEs 115. If the UEs 115 successfully receives one or more of the wake-up signals 210 transmitted by the base station 105-a, the UEs 115 may perform a wake-up procedure and transition to a higher power level to support data transmission and reception. In one example, the UEs 115 may attempt to receive the wake-up signals 210 using a number of downlink receive beams (not shown). In some examples, the UE 115-a may monitor wake-up signaling using a first set of downlink receive beams and the UE 115-b may monitor wake-up signaling using a second set of downlink receive beams.

In some examples, each wake-up signal 210 may either be a UE-specific or group-specific wake-up signal 210. In the example of FIG. 2, the base station 105-a may serve the UE 115-a and the UE 115-b within a geographic coverage area 110-a. In some instances, the base station 105-a may transmit a UE-specific wake-up signal 210 to initiate a wake-up procedure at one particular UE 115. In one example, the base station 105 may configure each UE 115 with a UE-specific RNTI (such as a C-RNTI). That is, each UE 115 may have a dedicated wake-up signal 210, where the DCI of the dedicated wake-up signal 210 is scrambled using the UE-specific RNTI (such as the C-RNTI). This may result in a large network overhead (e.g., for the base station 105-a to transmit individual wake-up signals 210 for each UE 115 scheduled to wake up) but highly flexible wake-up signaling. The base station 105-a may transmit a wake-up signal 210-a on a downlink channel 205-a to wake up the UE 115-a and a wake-up signal 210-b on a downlink channel 205-b to wake up the UE 115-b. In some instances, both wake-up signal 210-a and wake-up signal 210-b may be PDCCH-based wake-up signals.

In one or more conventional systems, the base station 105-a may configure each UE 115 (such as UE 115-a and UE 115-b) with a separate C-RNTI. In such cases, the UE 115-a may monitor the wake-up signal 210-a based on its configured C-RNTI (such as via RRC signaling), and the UE 115-b may monitor the wake-up signal 210-b based on its configured C-RNTI. That is, the UE 115-a may determine whether the CRC in the DCI of the wake-up signal 210-a is scrambled using a first C-RNTI. If the CRC in the DCI of the wake-up signal 210-a is scrambled using the first C-RNTI, then the UE 115-a may monitor the wake-up signal 210-a. Similarly, the UE 115-b may determine whether the CRC in the DCI of the wake-up signal 210-b is scrambled using a second C-RNTI. If the CRC in the DCI of the wake-up signal 210-b is scrambled using the second C-RNTI, then the UE 115-b may monitor the wake-up signal 210-b. However, in wireless communications systems (such as wireless communications system 200) where a base station 105-a serves a large number of UEs 115, the base station 105-a may have to transmit a wake-up signal (such as a PDCCH-based wake-up signal) for each UE 115 (i.e., a first wake-up signal 210-a for the UE 115-a and a second wake-up signal 210-b for the UE 115-b). Simultaneous transmission of multiple PDCCH-based wake-up signals may increase the use of PDCCH resources at the base station 105-a.

According to one or more aspects of the present disclosure, the base station 105-a may transmit a wake-up signal 210 associated with a common identifier (such as a wake-up signal RNTI or a power-saving RNTI). Such a wake-up signal 210 may be used to wake up both the UE 115-a and the UE 115-b if both of these UEs 115 are configured with the same identifier (i.e., both UE 115-a and UE 115-b are configured with the same wake-up signal RNTI). In some cases, each pre-defined or dynamically defined group of UEs 115 may share the same wake-up signal RNTI, or both. This may result in a low network overhead, as one or more UEs 115 may wake up based on a common identifier (such as a wake-up signal RNTI or a power-saving RNTI).

To support a large number of UEs 115 within a geographic coverage area 110-a and address the shortcoming of standing UE-specific identifiers (such as C-RNTIs) associated with wake-up signals, UEs 115 may be configured with one or more identifiers. That is, the base station 105-a may use a common identifier (such as a wake-up signal RNTI) for the wake-up signals intended for a UE 115 or group of UEs 115 (such as UE 115-a and UE 115-b). According to one implementation, the UE 115 or the group of UEs 115 (such as UE 115-a and UE 115-b) may monitor wake-up signals 210 based on the wake-up signal RNTI. Thus, configuration of multiple UEs 115 using common identifiers (such as using common wake-up signal RNTIs) described herein may efficiently use resources to support wake-up procedures for multiple UEs 115 with minimal resources (such as PDCCH resources) and minimal power penalties. That is, by configuring UEs 115 with common identifiers, the base station 105-a may configure multiple UEs 115 to monitor wake-up signals based on a common identifier (such as a common RNTI), and may save on resources for sending UE-specific wake-up signals for each UE 115.

According to one or more aspects of the present disclosure, a group of UEs 115 (such as UE 115-*a* and UE 115-*b*) may be configured with a common identifier. In one example, the common identifier may be a common RNTI (such as a wake-up signal RNTI). The group of UEs 115 may receive a configuration message (such as an RRC configuration) via higher layer signaling, and may determine one or more identifiers based on the configuration message. In some examples, the configuration message may be specific to each UE 115 (such as UE 115-*a* and UE 115-*b*) or may be common for a group of UEs 115. Following the configuring of the UEs 115 with the wake-up signal RNTI, the base station 105-*a* may select a specific group of UEs (e.g., the UE 115-*a*, the UE 115-*b*) for which the base station 105-*a* may have data for communications, and transmit a wake-up signal during a monitoring occasion using one or more wake-up signal resources. In one example, each UE from the group of UEs 115 may determine a common identifier (such as a wake-up signal RNTI) based on the configuration message. That is, the UE 115-*a* as well as UE 115-*b* may determine that they are configured with the wake-up signal RNTI (i.e., a power-saving RNTI). If the UE 115-*a* and the UE 115-*b* determine that they are configured with a common identifier (such as a wake-up signal RNTI), then both UEs 115 may monitor wake-up signals based on the common identifier (such as a wake-up signal RNTI). In some cases, the base station 105-*a* may configure UE 115-*a* to monitor wake-up signals based on the wake-up signal RNTI, and may configure UE 115-*b* to monitor wake-up signals based on a UE-specific identifier (such as C-RNTI). In this example, the UE 115-*a* may monitor a wake-up signal based on the wake-up signal RNTI. On the other hand, the UE 115-*b* may determine that it is not configured with the wake-up signal RNTI (i.e., a power-saving RNTI). Upon determining that it is not configured with the wake-up signal RNTI, the UE 115-*b* may monitor a wake-up signal based on the C-RNTI.

In the example of FIG. 2, the UE 115-*a* and the UE 115-*b* may each determine that a CRC in a DCI associated with a wake-up signal is scrambled using the wake-up signal RNTI (i.e., in cases where both the UE 115-*a* and the UE 115-*b* are configured with the same wake-up signal RNTIs). In one implementation, a UE 115 (such as UE 115-*a*, or UE 115-*b*, or both) may determine a first identifier (such as a common identifier or a wake-up signal RNTI) and a second identifier (such as UE-specific identifier or a C-RNTI) based on the configuration message. In such cases, the UE 115 (such as UE 115-*a*, or UE 115-*b*, or both) may monitor wake-up signals associated with both the first identifier (e.g., wake-up signal RNTI) and the second identifier (e.g., C-RNTI). For example, the UE 115 may monitor a first wake-up signal based on the first identifier and a second wake-up signal based on the second identifier. In some cases, the UE 115 (such as UE 115-*a*, or UE 115-*b*, or both) may monitor the first wake-up signal and the second wake-up signal during the same monitoring occasion (or same slot). In such cases, although the number of blind decodes performed by the UE 115 may increase, the RF chains associated with the UE 115 may remain active for a shorter time period. Alternatively, the UE 115 (such as UE 115-*a*, or UE 115-*b*, or both) may monitor the first wake-up signal and the second wake-up signal during different monitoring occasions. In such cases, the RF chains associated with the UE 115 may remain active for a longer time period and the number of blind decodes performed by the UE 115 may be reduced.

According to one or more aspects of the present disclosure, a UE 115 (such as UE 115-*a*, or UE 115-*b*, or both) may receive a DCI associated with a wake-up signal. Upon receiving the DCI, the UE 115 may analyze the content of the DCI to identify a bit mask associated with one or more intended recipients of the wake-up signal. In some examples, the bit mask may include a number of bits, where each bit corresponds to a single UE 115. If a bit in the bit mask is set to a particular value (such as 1), then the associated UE may determine that it is included in the one or more intended recipients. In one example, the UE 115 (such as UE 115-*a*, or UE 115-*b*, or both) may determine whether to monitor the wake-up signal (such as a PDCCH-based wake-up signal) based on the bit mask. That is, the UE 115 may monitor the wake-up signal based on determining that the UE 115 is included in the one or more intended recipients. In some examples, the bit mask may indicate whether to skip the upcoming duration associated with the discontinuous reception.

In some implementations, a UE 115 (such as UE 115-*a*, or UE 115-*b*, or both) or a group of UEs 115 (such as a group of UEs including UE 115-*a* and UE 115-*b*) may determine a DMRS scrambling seed associated with a wake-up signal. The UE 115 or the group of UEs 115 may monitor the wake-up signal based on the DMRS scrambling seed. According to one or more aspects, a base station 105-*a* may configure the UE 115 or the group of UEs 115 with a DMRS scrambling seed for the wake-up signal. The base station 105-*a* may then transmit a PDCCH associated with the wake-up signal, where the DMRS symbols are generated according to the configured scrambling seed. The UE 115 or the group of UEs 115 may receive the PDCCH associated with the wake-up signal, and may perform channel estimation using the DMRS, according to the configured scrambling seed. In some cases, the UE 115 or the group of UEs 115 may perform a sequence detection on the DMRS prior to performing channel estimation to determine whether a PDCCH was transmitted by the base station 105-*a*. In such cases, the UE 115 or the group of UEs 115 may decode the PDCCH associated with the wake-up signal after performing the channel estimation.

Thus, a common wake-up signal configuration (such as a wake-up signal RNTI) may provide resource efficiency for the base station 105-*a* and the UEs 115 by reducing or eliminating overheads associated with wake-up signaling for DRX operation. More specifically, the present techniques provide for improved power efficiencies for UEs 115 by enabling the base station 105-*a* to configure the UEs 115 with a common identifier for monitoring wake-up signals.

Figure 3:
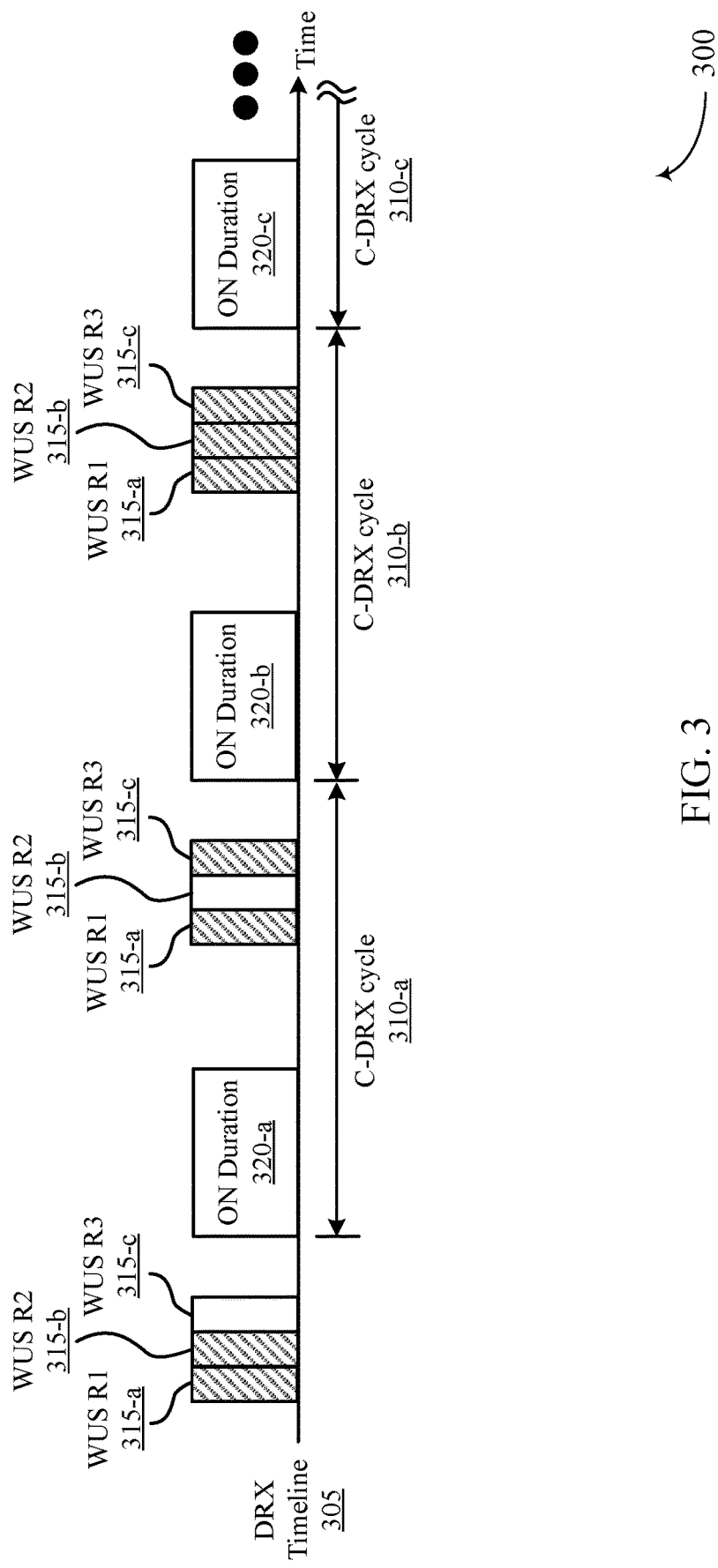
FIG. 3 illustrates an example of a timing diagram that supports monitoring wake-up signal using common identifier in accordance with aspects of the present disclosure.

FIG. 3 illustrates an example of a timing diagram 300 that supports monitoring wake-up signal using common identifier in accordance with aspects of the present disclosure. In some examples, timing diagram 300 may implement aspects of wireless communications system 100. In some examples, aspects of the timing diagram 300 may be implemented by a UE and/or base station, which may be examples of the corresponding device described herein. Broadly, the timing diagram 300 illustrates one example of a system supporting DRX mode operations. Some examples of the timing diagram 300 may support an improved wake-up signaling configuration for DRX operation, and more specifically a wake-up signaling configuration based on a common identifier. By configuring a group of UEs 115 according to a common identifier, a base station 105 can reduce PDCCH resources used for transmitting separate wake-up signals to different UEs 115. While the timing diagram 300, as illustrated, shows one possible wake-up signal transmission scenario, many other scenarios are possible using any of the techniques described herein.

A DRX timeline 305 illustrates the operations performed by a UE 115. For example, the UE 115 may monitor a channel (e.g., a PDCCH) for one or more wake-up signals from a base station 105 during a C-DRX cycle 310-a. Prior to the timing diagram 300 illustrated in FIG. 3, the UE 115 may receive a configuration message from the base station 105. The configuration message may be an RRC configuration message and may include one or more identifiers associated with a group of UEs. As explained with reference to FIG. 2, the base station 105 may configure a group of UEs 115 (such as a group including one or more UEs) with a common identifier (such as a wake-up signal RNTI). Additionally or alternatively, the base station 105 may configure each UE 115 from a group of UEs 115 with a UE-specific identifier (such as a C-RNTI). Upon identifying, the one or more identifiers, UE 115 may monitor one or more wake-up signal resources (e.g., time and frequency resources) for one or more wake-up signals from the base station 105. In the example of FIG. 3, the set of wake-up signal resources may include a first wake-up signal resource 315-a, a second wake-up signal resource 315-b, and a third wake-up signal resource 315-c.

Figure 4:
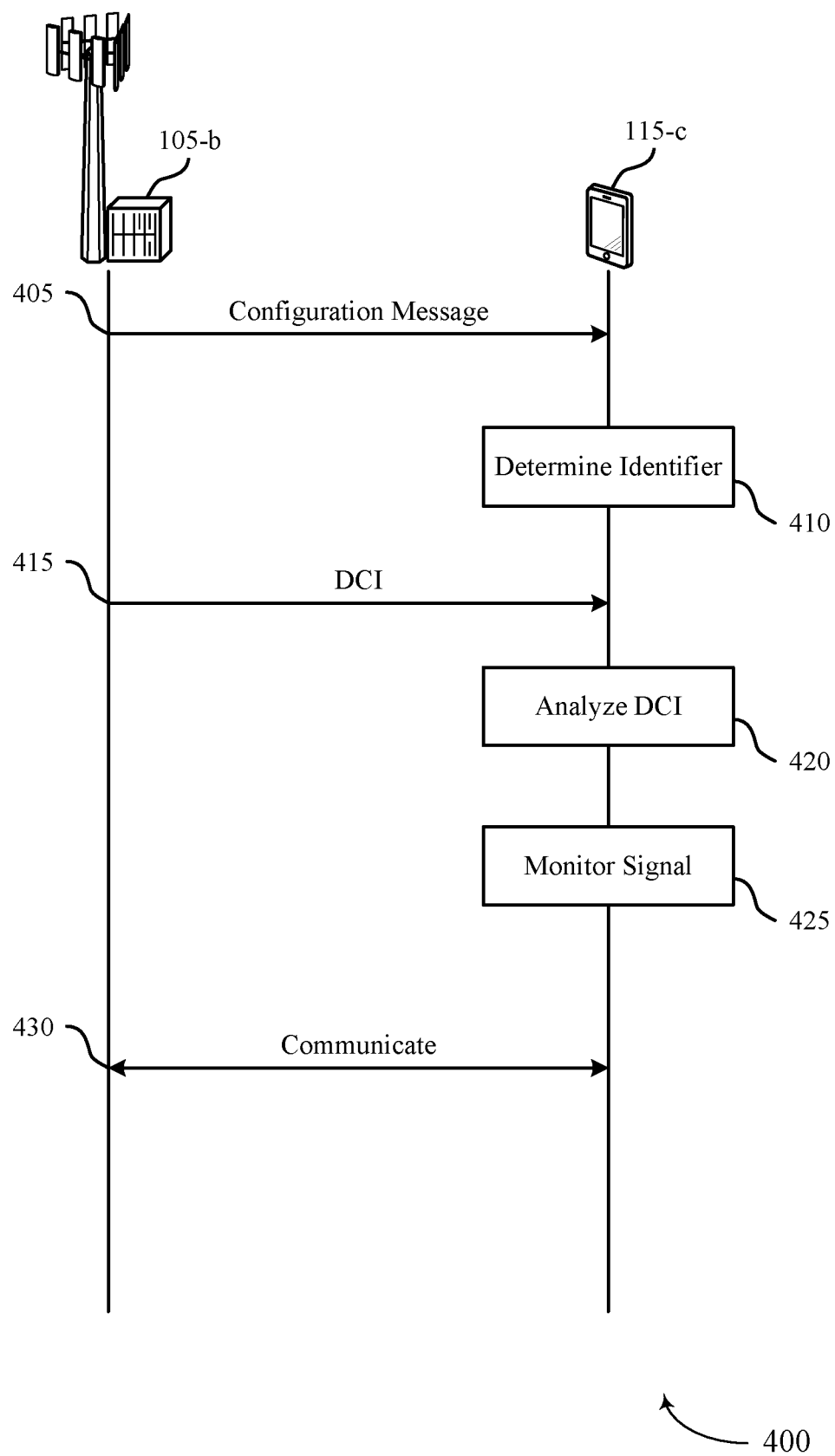
FIG. 4 illustrates an example of a process flow that supports monitoring wake-up signal using common identifier in accordance with aspects of the present disclosure.

A first UE 115 and a second UE 115, in the example of FIG. 4, may be configured with a common identifier (such as a wake-up signal RNTI). Additionally, a third UE 115 may be configured with a UE-specific identifier (such as C-RNTI). By way of example, the first UE 115-a may be designated the first wake-up signal resource 315-a, the second UE 115-b may be designated the second wake-up signal resource 315-b, and the third UE 115-b may be designated the third wake-up signal resource 315-c. That is, the first UE 115-a may monitor the first wake-up signal resource 315-a (e.g., time and frequency resources) for one or more wake-up signals from the base station 105, the second UE 115-a may monitor the second wake-up signal resource 315-b, and the third UE 115-a may monitor the third wake-up signal resource 315-b. In some examples, during the C-DRX cycle 310-a, the base station 105 may not have data to transmit to the UE 115 or receive from the UE 115. Thus, the base station 105 may not transmit a wake-up signal to the UE 115 on a wake-up signal resource. In the example of FIG. 3, the base station 105 may not transmit a wake-up signal to the third UE 115 on a wake-up signal resource 315-c during the first C-DRX cycle 310-a.

In some examples, if the UE 115 does not detect or otherwise receive a wake-up signal on a wake-up signal resource (e.g., wake-up signal resources 315-c during the first C-DRX cycle 310-a), then the UE 115 may skip a DRX ON duration 320-a and instead may return to the lower power mode (e.g., return to sleep). In this way, the UE 115 may reduce its power consumption by not entering a DRX ON duration when there is no data scheduled for reception or transmission. In some examples, during the C-DRX cycle 310-a, the base station 105 may have data to transmit to another UE 115 or receive from the other UE 115 (such as a first UE 115 and a second UE 115). Here, the base station 105 may transmit to the other UE 115 (such as a first UE 115 and a second UE 115) a wake-up signal on a wake-up signal resource (e.g., the wake-up signal resources 315-a and 315-b during the first C-DRX cycle 310-a) that corresponds to the first UE 115 and the second UE 115. As previously described, the first UE 115 and the second UE 115 may both be configured with a common identifier (such as wake-up signal RNTI). The first UE 115 and the second UE 115 may then monitor for the wake-up signals on the wake-up signal resources (e.g., the wake-up signal resources 315-a and 315-b during the first C-DRX cycle 310-a) based on the wake-up signal RNTI.

Additionally, during the C-DRX cycle 310-b, the base station 105 may not have data to transmit to the second UE 115 or receive from the second UE 115. However, the base station 105 may have data to transmit to or receive from the second UE 115 and the third UE 115. In one example, the first UE 115 and the second UE 115 may be configured with a common identifier (such as a wake-up signal RNTI) and the third UE 115 may not be configured with the common identifier. In such cases, the first UE 115 may monitor for the wake-up signals on the wake-up signal resources (e.g., the wake-up signal resources 315-a during the second C-DRX cycle 310-b) based on the wake-up signal RNTI, and the third UE 115 may monitor for the wake-up signals on the wake-up signal resources (e.g., the wake-up signal resources 315-c during the second C-DRX cycle 310-b) based on the C-RNTI.

During the C-DRX cycle 310-c, the base station 105 may identify data to transmit to or data to receive from the first UE 115, the second UE 115, and the third UE 115. In this example, the first UE 115 and the second UE 115 may be configured with the wake-up signal RNTI, and the third UE 115 may not be configured with the wake-up signal RNTI (and instead be configured with the C-RNTI). In such cases, the first UE 115 may monitor for the wake-up signals on the wake-up signal resources (e.g., the wake-up signal resources 315-a during the third C-DRX cycle 310-c) based on the wake-up signal RNTI, the second UE 115 may monitor for the wake-up signals on the wake-up signal resources (e.g., the wake-up signal resources 315-b during the third C-DRX cycle 310-c) based on the wake-up signal RNTI, and the third UE 115 may monitor for the wake-up signals on the wake-up signal resources (e.g., the wake-up signal resources 315-c during the third C-DRX cycle 310-c) based on the C-RNTI.

In some examples, the UE 115 may be configured with a particular decoding hypothesis for successfully decoding a received wake-up signal according to the wake-up signal configuration for the UE 115. As a result, the UE 115 may identify the wake-up signal based on the successful decoding hypothesis and initiate a wake-up procedure for the UE 115. The wake-up procedure may include switching to an active mode to monitor a control channel subsequent to initiating the wake-up procedure. For example, subsequently, the UE 115 may receive, within the control channel, a grant from the base station 105 and communicate with the base station 105 based in part on the grant. Although FIG. 3 demonstrates that the UE 115 receives the wake-up signals (such as PDCCH-based wake-up signals) during a C-DRX cycle, where the wake-up signals indicate an ON duration for an upcoming C-DRX cycle, it may be understood that the UE 115 may receive the wake-up signals at the beginning of an ON duration of a C-DRX cycle. In such cases, the wake-up signal may indicate whether the UE 115 should wake up for the remainder of the ON duration (such as the ON duration where the wake-up signal was received).

Thus, the techniques described herein may provide efficacy to the base station 105 and the UE 115 by reducing or eliminating latencies associated with processes related to wake-up signaling. More specifically, a common wake-up signal configuration (such as a wake-up signal RNTI) may provide resource efficiency for a base station 105 and UEs 115 by reducing or eliminating overheads associated with wake-up signaling for DRX operation.

FIG. 4 illustrates an example of a process flow 400 that supports monitoring wake-up signal using common identifier in accordance with aspects of the present disclosure. In some examples, process flow 400 may implement aspects of wireless communications system 100. The process flow 400 may include base station 105-b and UE 115-c, which may be examples of the corresponding devices described with reference to FIGS. 1 through 3. UE 115-b and base station 105-c may support monitoring wake-up signal using common identifier to achieve resource savings.

In the following description of the process flow 400, the operations between UE 115-c and base station 105-b may be transmitted in a different order than the exemplary order shown. The operations performed by UE 115-c or base station 105-b may be performed in different orders or at different times than the exemplary order shown. Certain operations may also be left out of the process flow 400, or other operations may be added to the process flow 400. Further, UE 115-c and base station 105-b are not meant to be representative, as the described features may be associated with any number of devices.

At 405, base station 105-b may transmit a configuration message that includes one or more identifiers associated with a group of UEs. The UE 115-c may receive the configuration message via an RRC signaling. In some cases, the one or more identifiers may include a wake-up signal RNTI (or a power-saving RNTI), a C-RNTI, or an combination thereof.

At 410, the UE 115-c may determine at least one identifier based on receiving the configuration message. For example, the UE 115-c may determine whether it is configured with a common identifier (such as a wake-up signal RNTI), a UE-specific identifier (such as a C-RNTI), or both.

At 415, the UE 115-c may receive a DCI. Upon receiving the DCI, at 420, the UE 115-c may analyze content of the DCI to identify a bit mask associated with one or more intended recipients of the signal. The UE 115-c may additionally determine whether the UE 115-c is included in the one or more intended recipients. If the UE 115-c is included in the one or more intended recipients, then the UE 115-c may decide to monitor a wake-up signal.

At 425, the UE 115-c may monitor a signal (such as a wake-up signal) based on the at least one identifier. In some cases, the signal may indicate whether the UE 115-c should skip an upcoming duration associated with a DRX operation. Additionally or alternatively, the UE 115-c may determine that a CRC in a DCI associated with the signal is scrambled using the at least one identifier (such as the wake-up signal RNTI or the C-RNTI). In some cases, the UE 115-c may monitor the wake-up signal based on the determining. IN some examples, the UE 115-c may determine that it is not configured with the common identifier (such as the wake-up signal RNTI). In such cases, the UE 115-c may monitor the wake-up signal based on the C-RNTI. Additionally or alternatively, the UE 115-c may be configured with both the wake-up signal RNTI and the C-RNTI. In such cases, the UE 115-c may monitor a first wake-up signal based on the wake-up signal RNTI, and may monitor a second wake-up signal based on the C-RNTI. In some cases, the UE 115-c may monitor the first wake-up signal and the second wake-up signal during the same monitoring occasion (or same slot). In other cases, the UE 115-c may monitor the first wake-up signal and the second wake-up signal during different monitoring occasions.

At 430, the UE 115-c may communicate with the base station 105-b based on monitoring the wake-up signal.

Figure 5:
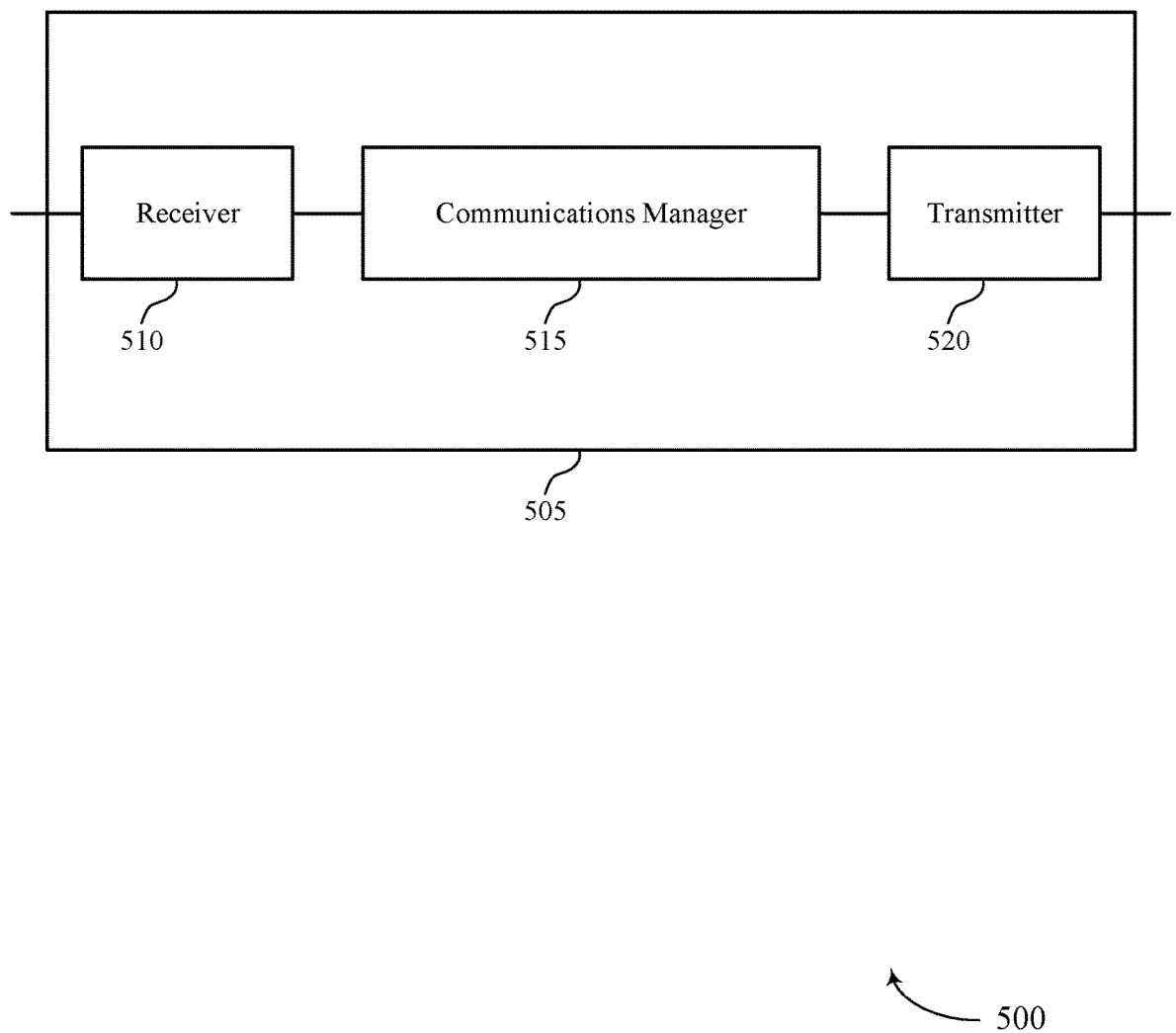
FIGS. 5 and 6 show diagrams of devices that support monitoring wake-up signal using common identifier in accordance with aspects of the present disclosure.

FIG. 5 shows a diagram 500 of a device 505 that supports monitoring wake-up signal using common identifier in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to monitoring wake-up signal using common identifier, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive, from a base station, a configuration message that includes one or more identifiers associated with a group of UEs, determine at least one identifier based on receiving the configuration message, monitor a signal based on the at least one identifier, where the signal indicates whether to skip an upcoming duration associated with a discontinuous reception, and communicate, with the base station, based on monitoring the signal. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
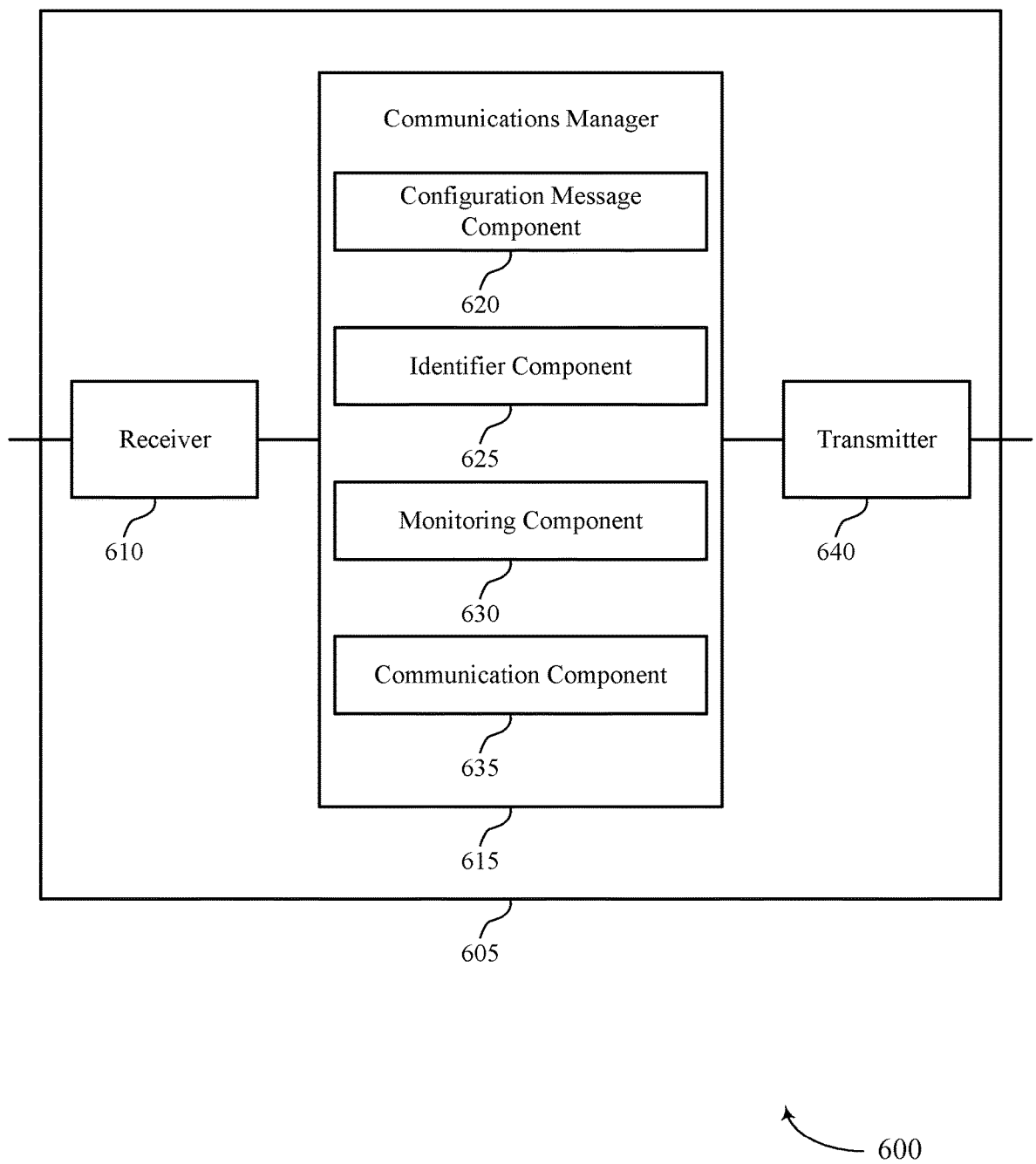

FIG. 6 shows a diagram 600 of a device 605 that supports monitoring wake-up signal using common identifier in accordance with aspects of the present disclosure. The device 605 may be an example of aspects of a device 505, or a UE 115 as described herein. The device 605 may include a receiver 610, a communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to monitoring wake-up signal using common identifier, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a configuration message component 620, an identifier component 625, a monitoring component 630, and a communication component 635. The communications manager 615 may be an example of aspects of the communications manager 810 described herein.

The configuration message component 620 may receive, from a base station, a configuration message that includes one or more identifiers associated with a group of UEs. The identifier component 625 may determine at least one identifier based on receiving the configuration message. The monitoring component 630 may monitor a signal based on the at least one identifier, where the signal indicates whether to skip an upcoming duration associated with a discontinuous reception. The communication component 635 may communicate, with the base station, based on monitoring the signal.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
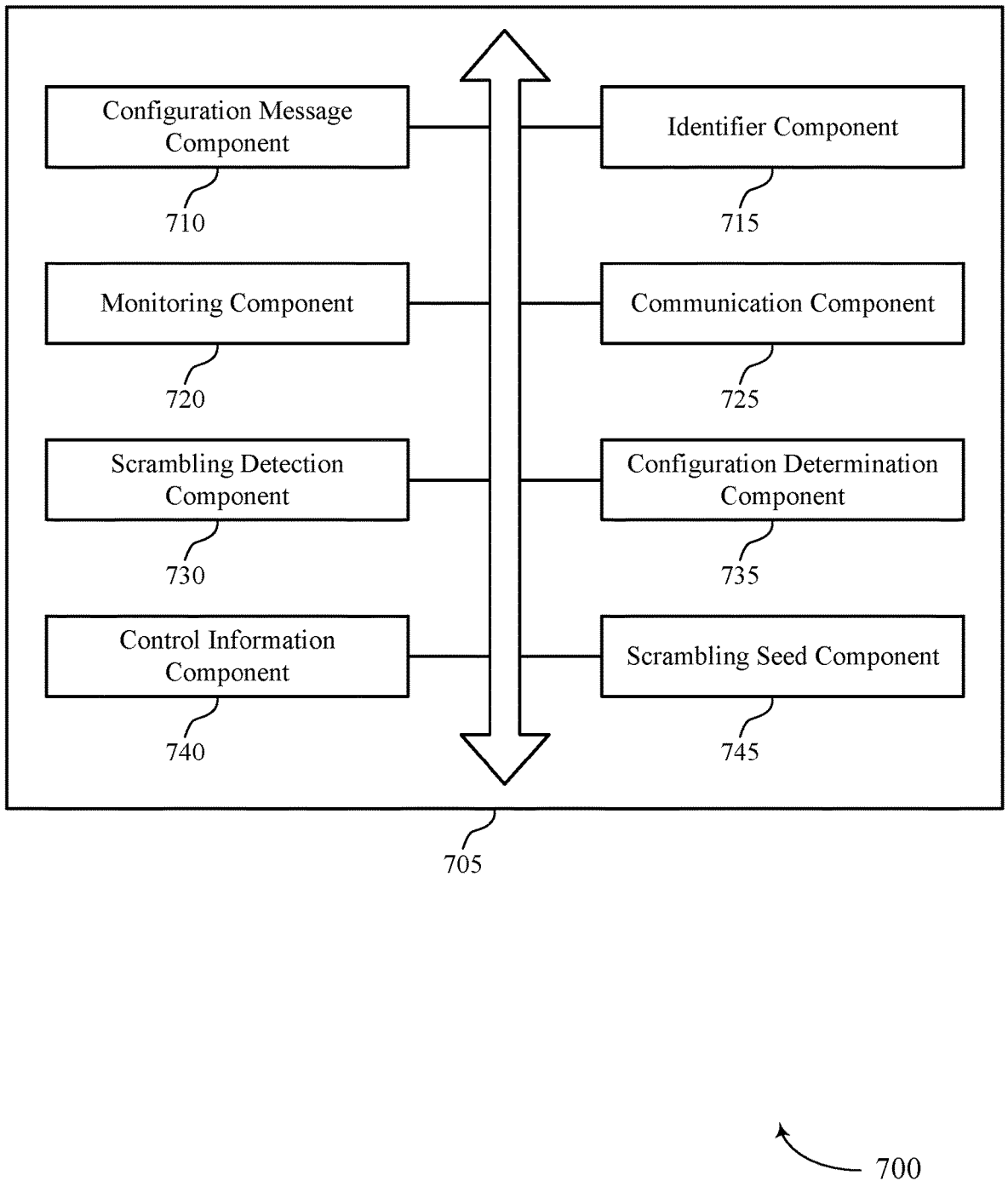
FIG. 7 shows a diagram of a communications manager that supports monitoring wake-up signal using common identifier in accordance with aspects of the present disclosure.

FIG. 7 shows a diagram 700 of a communications manager 705 that supports monitoring wake-up signal using common identifier in accordance with aspects of the present disclosure. The communications manager 705 may be an example of aspects of a communications manager 515, a communications manager 615, or a communications manager 810 described herein. The communications manager 705 may include a configuration message component 710, an identifier component 715, a monitoring component 720, a communication component 725, a scrambling detection component 730, a configuration determination component 735, a control information component 740, and a scrambling seed component 745. Each of these modules may communicate, directly or indirectly, with one another (e.g., via one or more buses).

The configuration message component 710 may receive, from a base station, a configuration message that includes one or more identifiers associated with a group of UEs. In some cases, the configuration message is a RRC configuration message. In some cases, the group of UEs include one or more UEs.

The identifier component 715 may determine at least one identifier based on receiving the configuration message. In some examples, the identifier component 715 may determine a second identifier based on receiving the configuration message, where the at least one identifier is a wake-up signal RNTI and the second identifier is a C-RNTI. In some cases, the at least one identifier is a wake-up signal RNTI, where monitoring the signal further includes monitoring a wake-up signal based on the wake-up signal RNTI. In some cases, the wake-up signal RNTI is same for the group of UEs.

In some cases, the at least one identifier is a C-RNTI, where monitoring the signal further includes monitoring a wake-up signal based on the C-RNTI. In some cases, the C-RNTI is uniquely associated with the UE.

The monitoring component 720 may monitor a signal based on the at least one identifier, where the signal indicates whether to skip an upcoming duration associated with a discontinuous reception. In some examples, the monitoring component 720 may monitor a first wake-up signal based on the at least one identifier. In some examples, the monitoring component 720 may monitor a second wake-up signal based on the second identifier. In some examples, the monitoring component 720 may monitor the first wake-up signal and the second wake-up signal occurs during a monitoring occasion. In some examples, the monitoring component 720 may monitor the first wake-up signal and the second wake-up signal occurs during different monitoring occasions.

In some examples, the monitoring component 720 may determine whether to monitor a second signal based on the bit mask, where monitoring the second signal is based on determining that the UE is included in the one or more intended recipients. In some cases, the signal is a PDCCH-based wake-up signal. In some examples, the bit mask indicates whether to skip the upcoming duration associated with the discontinuous reception, where monitoring the signal is based on the bit mask.

The communication component 725 may communicate, with the base station, based on monitoring the signal. The scrambling detection component 730 may determine that a CRC in a DCI associated with the signal is scrambled using the at least one identifier, where monitoring the signal is based on the determining.

The configuration determination component 735 may determine that the UE is not configured with a first indicator based on the configuration message, where monitoring the signal further includes monitoring the signal based on a second identifier, and where the first identifier is a wake-up signal RNTI and the second identifier is a cell C-RNTI.

The control information component 740 may receive a DCI associated with the signal. In some examples, the control information component 740 may analyze content of the DCI to identify a bit mask associated with one or more intended recipients of the signal. The scrambling seed component 745 may determine a DMRS scrambling seed associated with the signal, where monitoring the signal is based on determining the DMRS scrambling seed.

Figure 8:
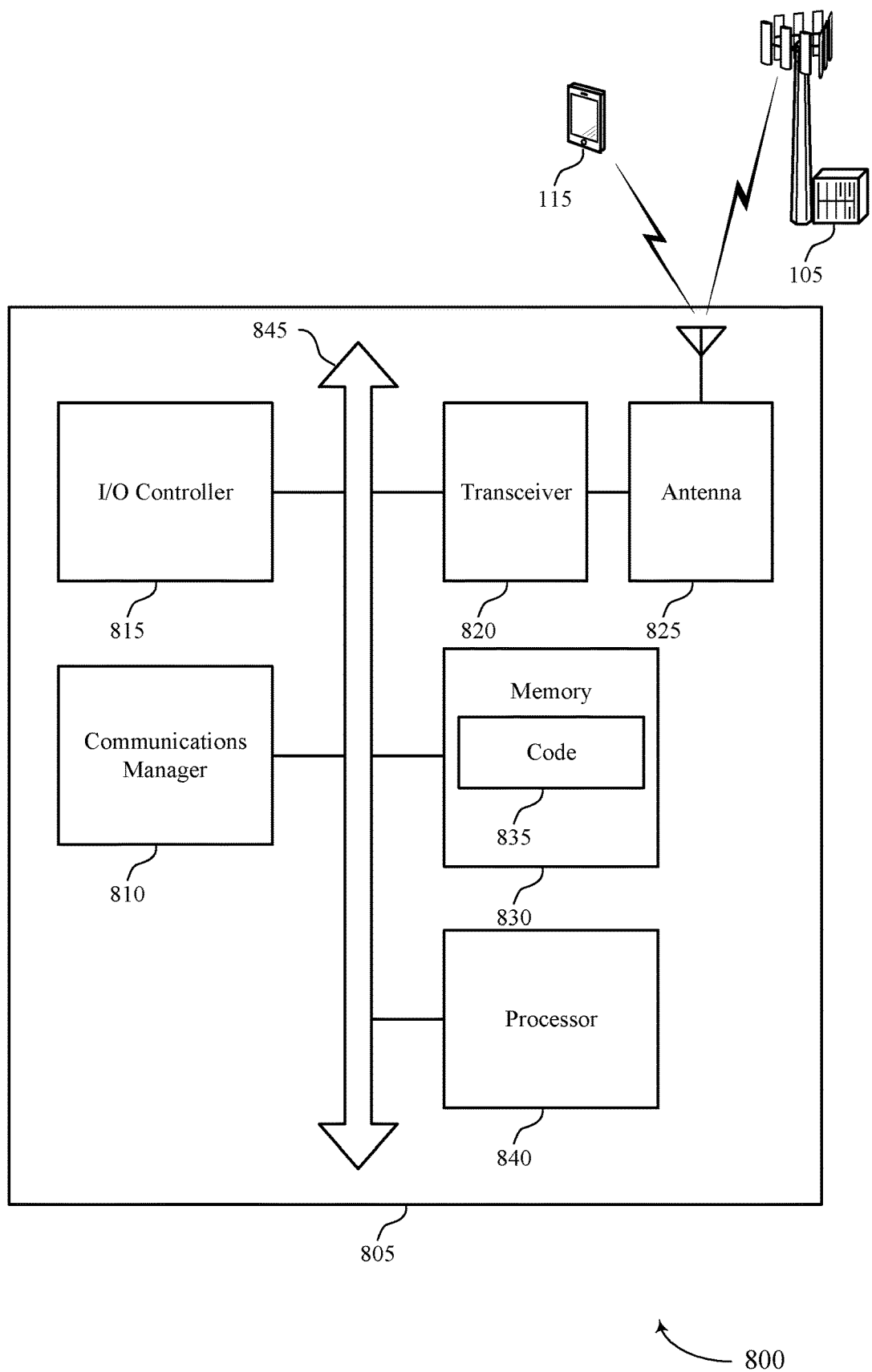
FIG. 8 shows a diagram of a system including a device that supports monitoring wake-up signal using common identifier in accordance with aspects of the present disclosure.

FIG. 8 shows a diagram of a system 800 including a device 805 that supports monitoring wake-up signal using common identifier in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive, from a base station, a configuration message that includes one or more identifiers associated with a group of UEs, determine at least one identifier based on receiving the configuration message, monitor a signal based on the at least one identifier, where the signal indicates whether to skip an upcoming duration associated with a discontinuous reception, and communicate, with the base station, based on monitoring the signal.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touch-screen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting monitoring wake-up signal using common identifier).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
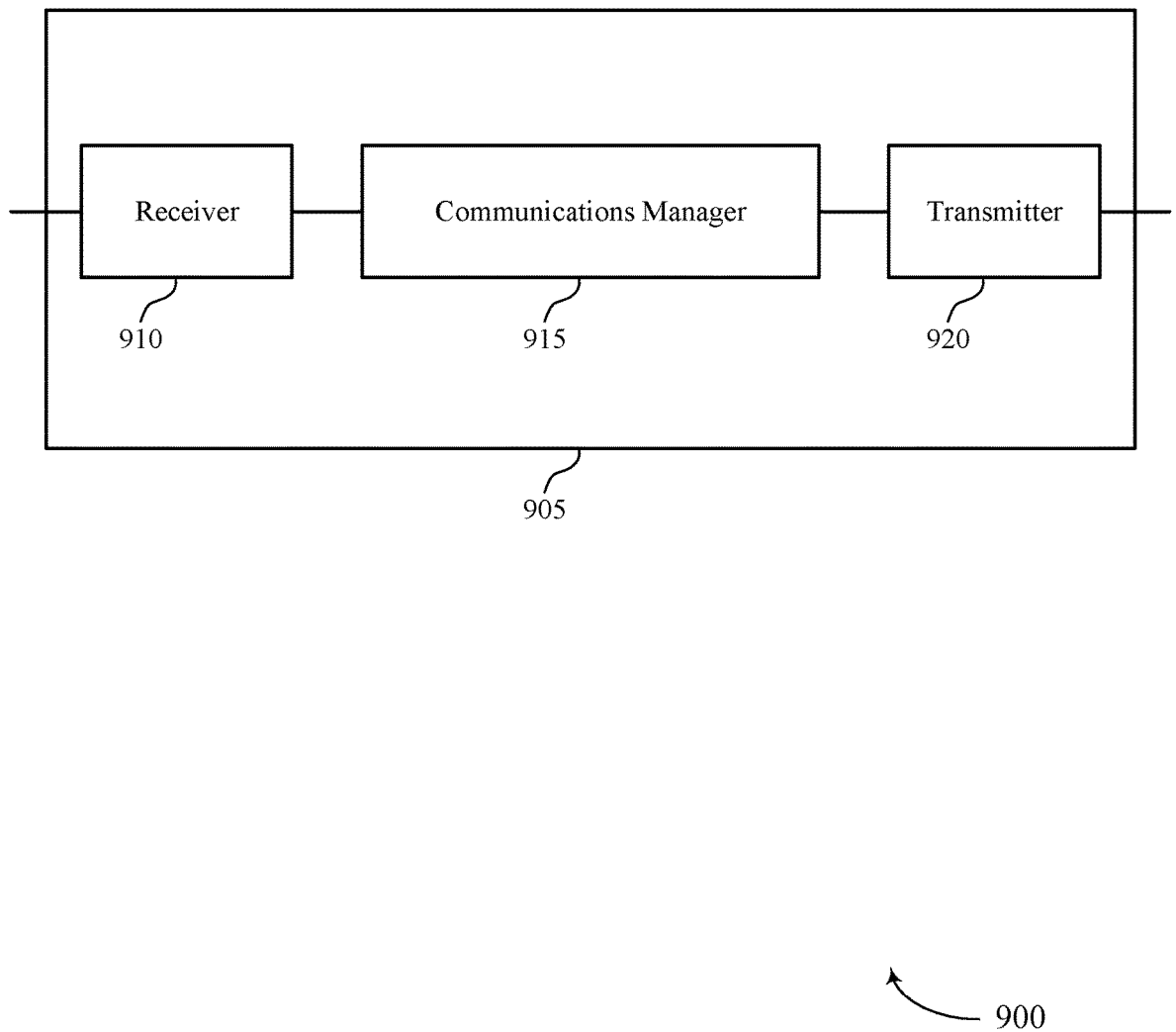
FIGS. 9 and 10 show diagrams of devices that support monitoring wake-up signal using common identifier in accordance with aspects of the present disclosure.

FIG. 9 shows a diagram 900 of a device 905 that supports monitoring wake-up signal using common identifier in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to monitoring wake-up signal using common identifier, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may transmit, to a UE, a configuration message that includes one or more identifiers associated with a group of UEs, configure the UE with at least one identifier based on transmitting the configuration message, transmit a signal based on the at least one identifier, where the signal indicates whether to skip an upcoming duration associated with a discontinuous reception, and communicate, with the UE, based on the signal. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
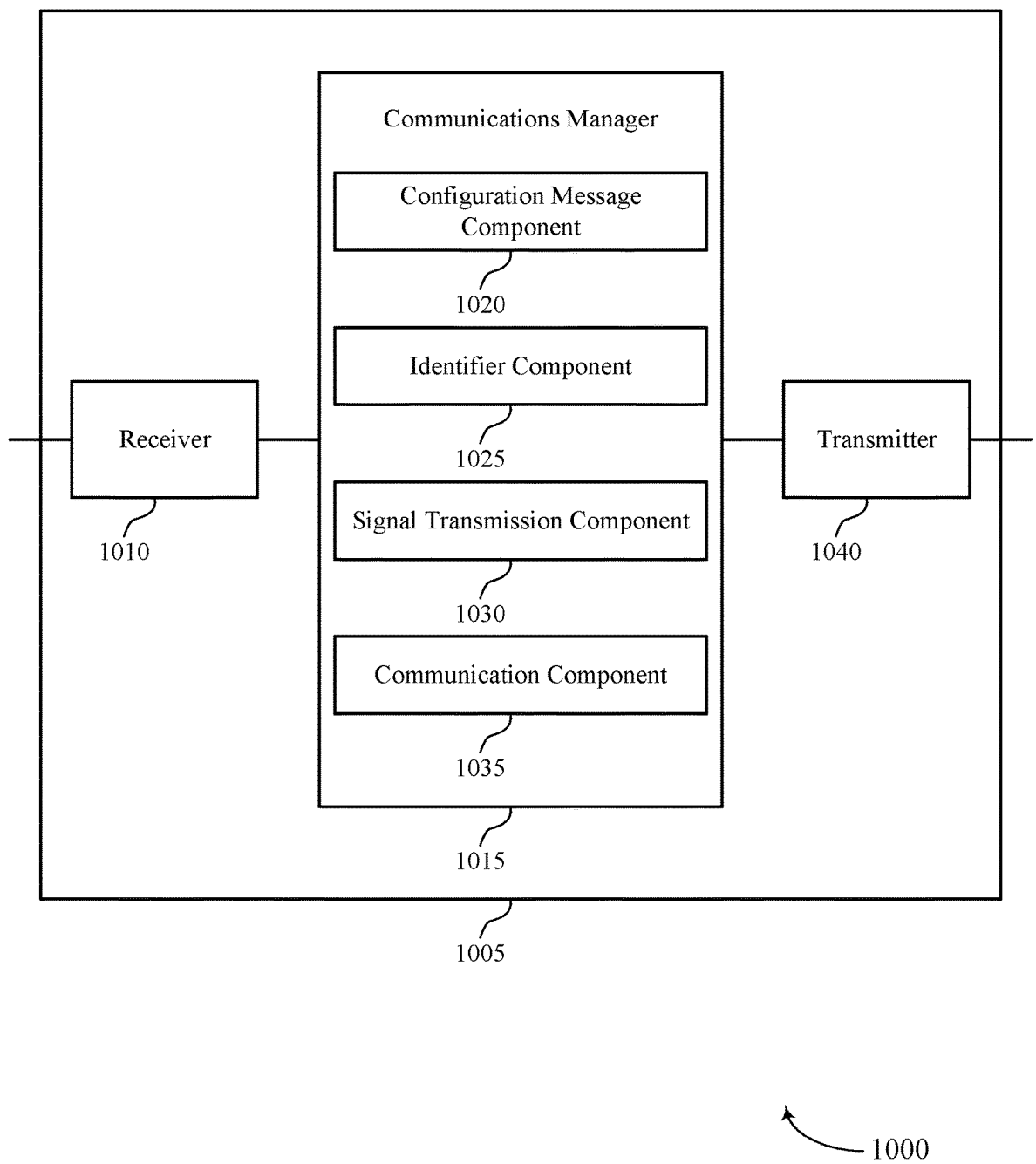

FIG. 10 shows a diagram 1000 of a device 1005 that supports monitoring wake-up signal using common identifier in accordance with aspects of the present disclosure. The device 1005 may be an example of aspects of a device 905, or a base station 105 as described herein. The device 1005 may include a receiver 1010, a communications manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to monitoring wake-up signal using common identifier, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a configuration message component 1020, an identifier component 1025, a signal transmission component 1030, and a communication component 1035. The communications manager 1015 may be an example of aspects of the communications manager 1210 described herein.

The configuration message component 1020 may transmit, to a UE, a configuration message that includes one or more identifiers associated with a group of UEs. The identifier component 1025 may configure the UE with at least one identifier based on transmitting the configuration message. The signal transmission component 1030 may transmit a signal based on the at least one identifier, where the signal indicates whether to skip an upcoming duration associated with a discontinuous reception. The communication component 1035 may communicate, with the UE, based on the signal.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
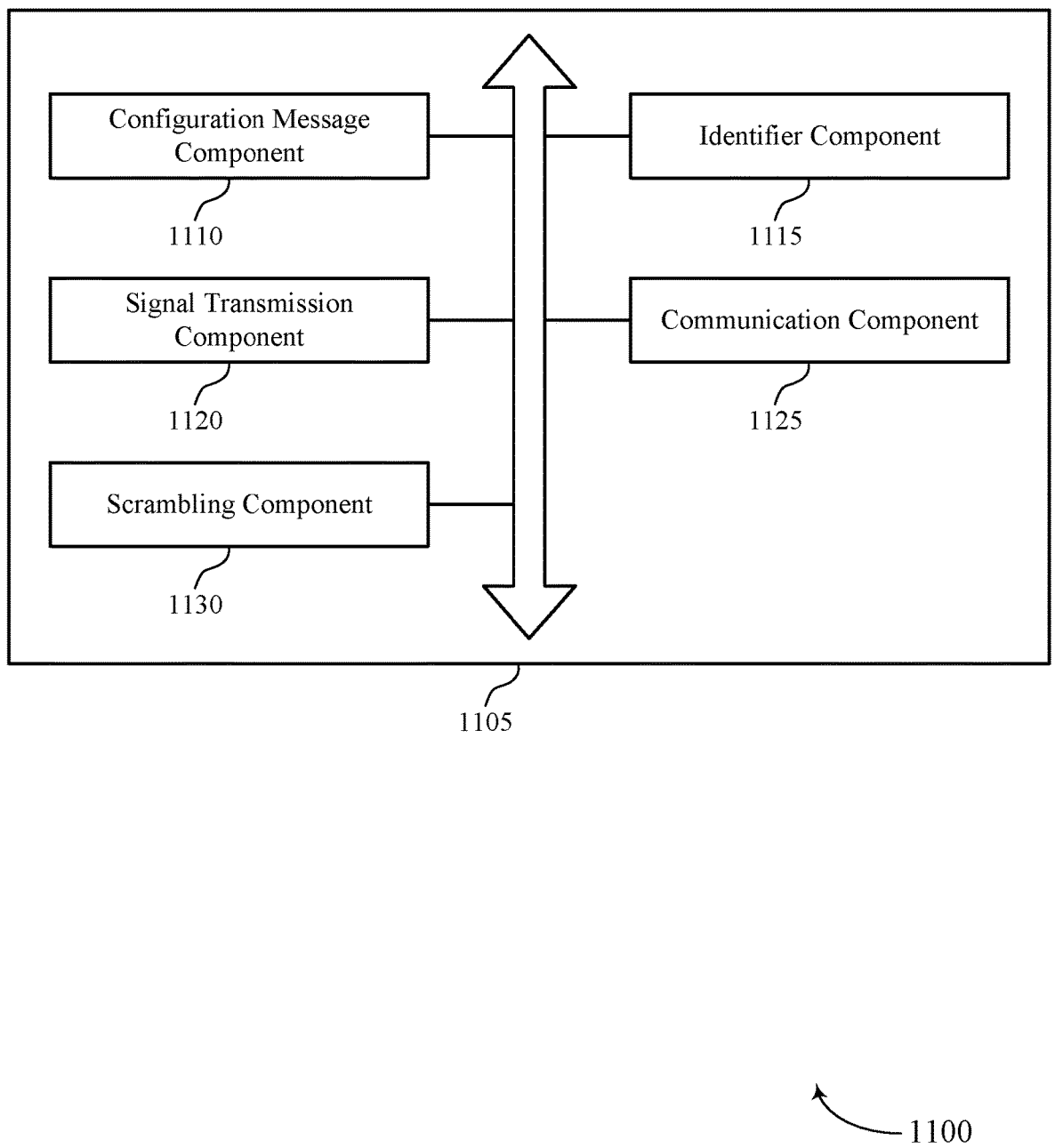
FIG. 11 shows a diagram of a communications manager that supports monitoring wake-up signal using common identifier in accordance with aspects of the present disclosure.

FIG. 11 shows a diagram 1100 of a communications manager 1105 that supports monitoring wake-up signal using common identifier in accordance with aspects of the present disclosure. The communications manager 1105 may be an example of aspects of a communications manager 915, a communications manager 1015, or a communications manager 1210 described herein. The communications manager 1105 may include a configuration message component 1110, an identifier component 1115, a signal transmission component 1120, a communication component 1125, and a scrambling component 1130. Each of these modules may communicate, directly or indirectly, with one another (e.g., via one or more buses).

The configuration message component 1110 may transmit, to a UE, a configuration message that includes one or more identifiers associated with a group of UEs. In some cases, the configuration message is a RRC configuration message. In some cases, the group of UEs includes one or more UEs. The identifier component 1115 may configure the UE with at least one identifier based on transmitting the configuration message. In some examples, the identifier component 1115 may configure the UE with a second identifier based on transmitting the configuration message, where the at least one identifier is a wake-up signal RNTI and the second identifier is a C-RNTI.

In some cases, the at least one identifier is a wake-up signal RNTI, where transmitting the signal further includes transmitting a wake-up signal based on the wake-up signal RNTI. In some cases, the wake-up signal RNTI is same for the group of UEs. In some cases, the at least one identifier is a C-RNTI, where transmitting the signal further includes transmitting a wake-up signal based on the C-RNTI. In some cases, the C-RNTI is uniquely associated with the UE.

The signal transmission component 1120 may transmit a signal based on the at least one identifier, where the signal indicates whether to skip an upcoming duration associated with a discontinuous reception. In some examples, the signal transmission component 1120 may transmit a first wake-up signal based on the at least one identifier. In some examples, the signal transmission component 1120 may transmit a second wake-up signal based on the second identifier. In some cases, the signal is a PDCCH-based wake-up signal.

The communication component 1125 may communicate, with the UE, based on the signal. The scrambling component 1130 may scramble, using the at least one identifier, a CRC in a DCI associated with the signal, where transmitting the signal further including transmitting the signal including the scrambled CRC.

Figure 12:
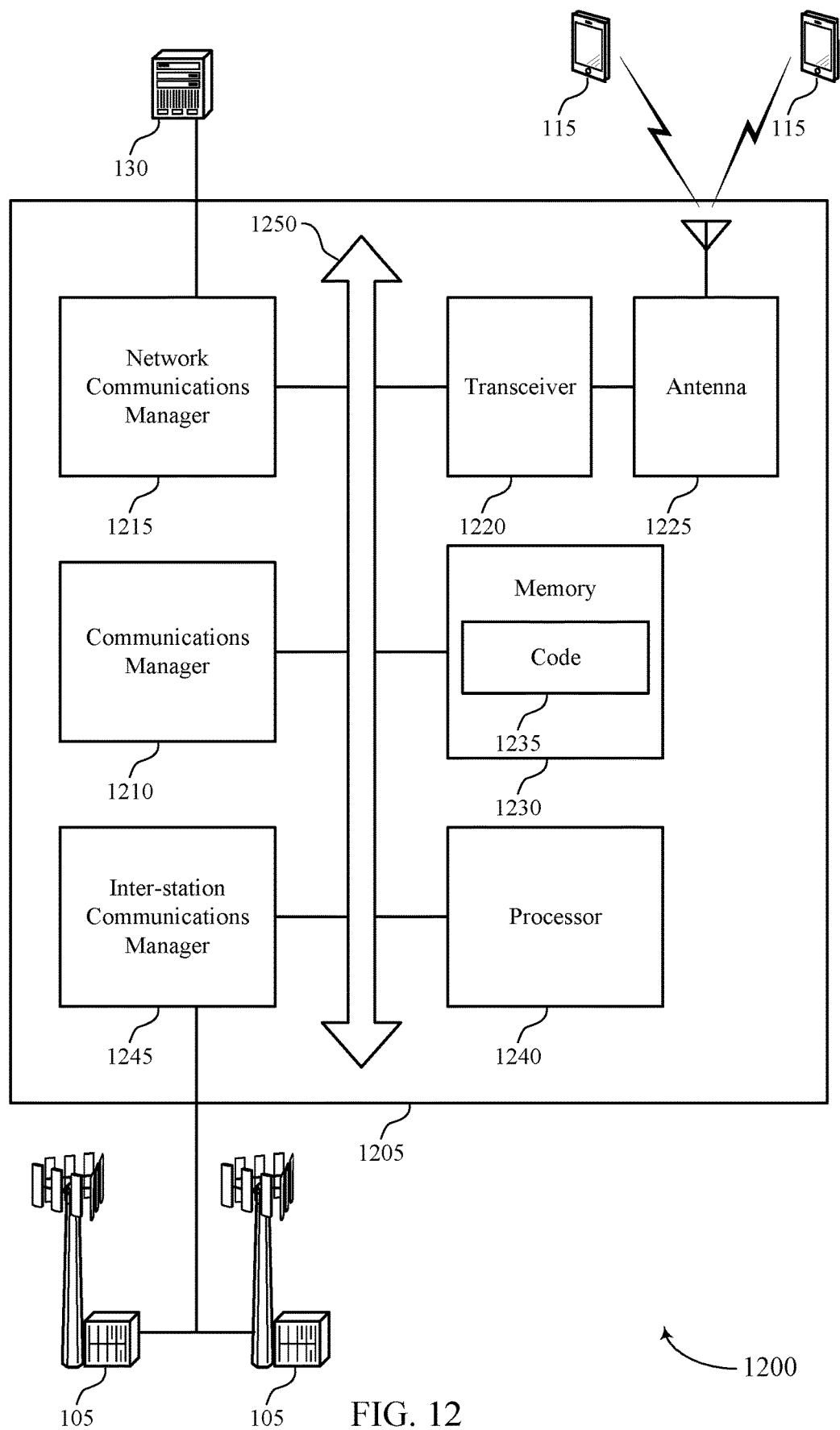
FIG. 12 shows a diagram of a system including a device that supports monitoring wake-up signal using common identifier in accordance with aspects of the present disclosure.

FIG. 12 shows a diagram of a system 1200 including a device 1205 that supports monitoring wake-up signal using common identifier in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may transmit, to a UE, a configuration message that includes one or more identifiers associated with a group of UEs, configure the UE with at least one identifier based on transmitting the configuration message, transmit a signal based on the at least one identifier, where the signal indicates whether to skip an upcoming duration associated with a discontinuous reception, and communicate, with the UE, based on the signal.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting monitoring wake-up signal using common identifier).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
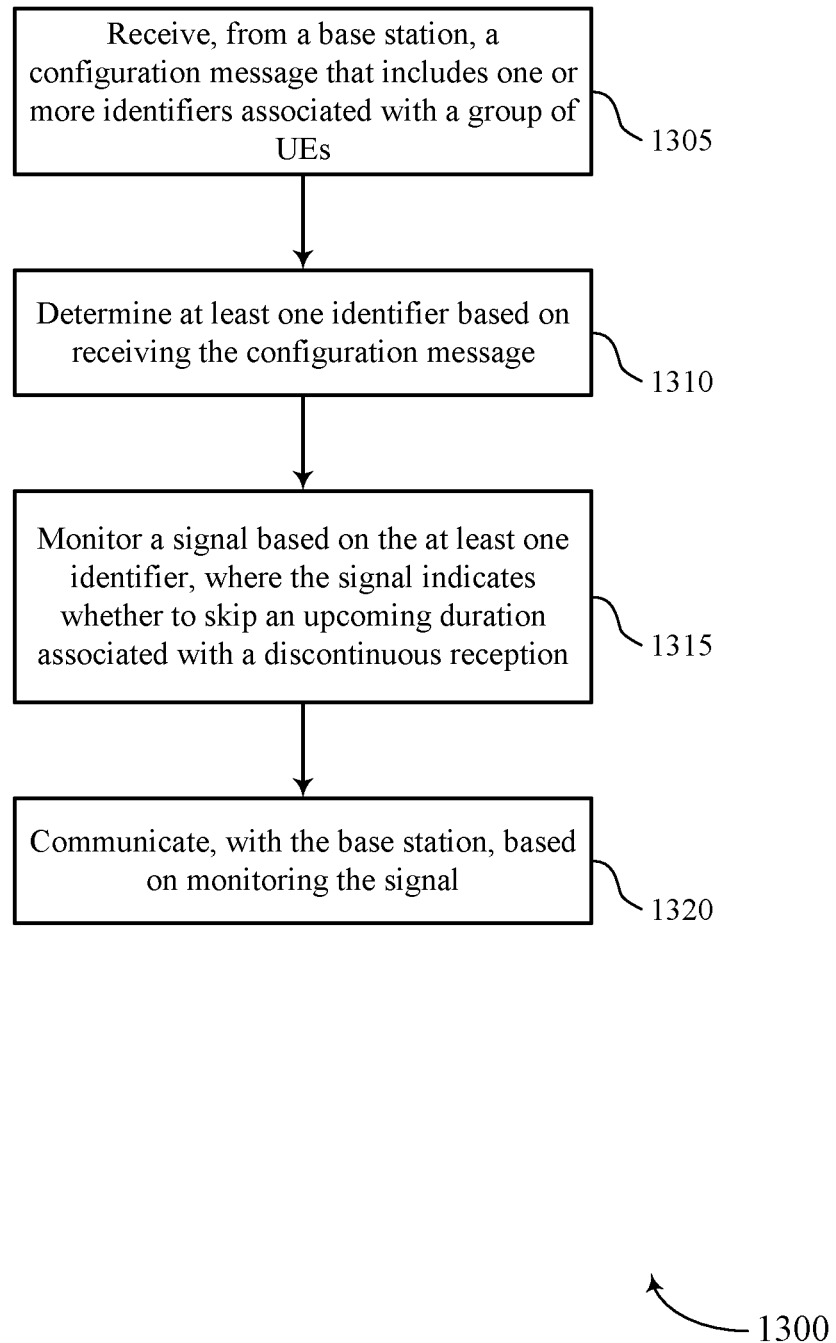
FIGS. 13 through 16 show flowcharts illustrating methods that support monitoring wake-up signal using common identifier in accordance with aspects of the present disclosure.

FIG. 13 shows a flowchart illustrating a method 1300 that supports monitoring wake-up signal using common identifier in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may receive, from a base station, a configuration message that includes one or more identifiers associated with a group of UEs. The operations of 1305 may be performed according to the methods described herein. In some examples, aspects of the operations of 1305 may be performed by a configuration message component as described with reference to FIGS. 5 through 8.

At 1310, the UE may determine at least one identifier based on receiving the configuration message. The operations of 1310 may be performed according to the methods described herein. In some examples, aspects of the operations of 1310 may be performed by an identifier component as described with reference to FIGS. 5 through 8.

At 1315, the UE may monitor a signal based on the at least one identifier, where the signal indicates whether to skip an upcoming duration associated with a discontinuous reception. The operations of 1315 may be performed according to the methods described herein. In some examples, aspects of the operations of 1315 may be performed by a monitoring component as described with reference to FIGS. 5 through 8.

At 1320, the UE may communicate, with the base station, based on monitoring the signal. The operations of 1320 may be performed according to the methods described herein. In some examples, aspects of the operations of 1320 may be performed by a communication component as described with reference to FIGS. 5 through 8.

Figure 14:
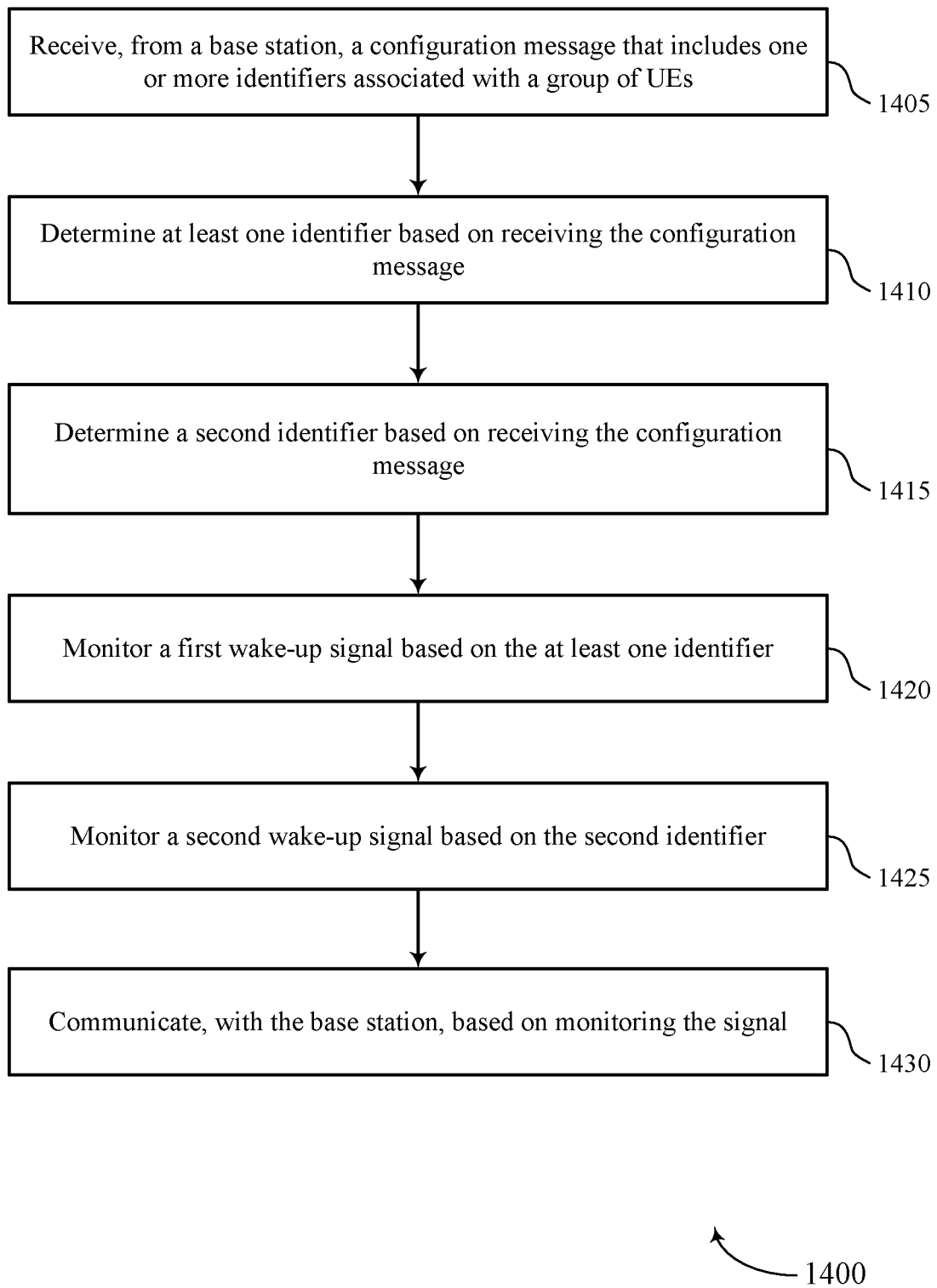

FIG. 14 shows a flowchart illustrating a method 1400 that supports monitoring wake-up signal using common identifier in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may receive, from a base station, a configuration message that includes one or more identifiers associated with a group of UEs. The operations of 1405 may be performed according to the methods described herein. In some examples, aspects of the operations of 1405 may be performed by a configuration message component as described with reference to FIGS. 5 through 8.

At 1410, the UE may determine at least one identifier based on receiving the configuration message, where the at least one identifier is a wake-up signal RNTI. The operations of 1410 may be performed according to the methods described herein. In some examples, aspects of the operations of 1410 may be performed by an identifier component as described with reference to FIGS. 5 through 8.

At 1415, the UE may determine a second identifier based on receiving the configuration message, where the second identifier is a C-RNTI. The operations of 1415 may be performed according to the methods described herein. In some examples, aspects of the operations of 1415 may be performed by an identifier component as described with reference to FIGS. 5 through 8.

At 1420, the UE may monitor a first wake-up signal based on the at least one identifier. The operations of 1420 may be performed according to the methods described herein. In some examples, aspects of the operations of 1420 may be performed by a monitoring component as described with reference to FIGS. 5 through 8.

At 1425, the UE may monitor a second wake-up signal based on the second identifier. In some examples, the UE may monitor the first wake-up signal and the second wake-up signal during the same monitoring occasion. In some examples, the UE may monitor the first wake-up signal and the second wake-up signal during different monitoring occasions. The operations of 1425 may be performed according to the methods described herein. In some examples, aspects of the operations of 1425 may be performed by a monitoring component as described with reference to FIGS. 5 through 8.

At 1430, the UE may communicate, with the base station, based on monitoring the signal. The operations of 1430 may be performed according to the methods described herein. In some examples, aspects of the operations of 1430 may be performed by a communication component as described with reference to FIGS. 5 through 8.

Figure 15:
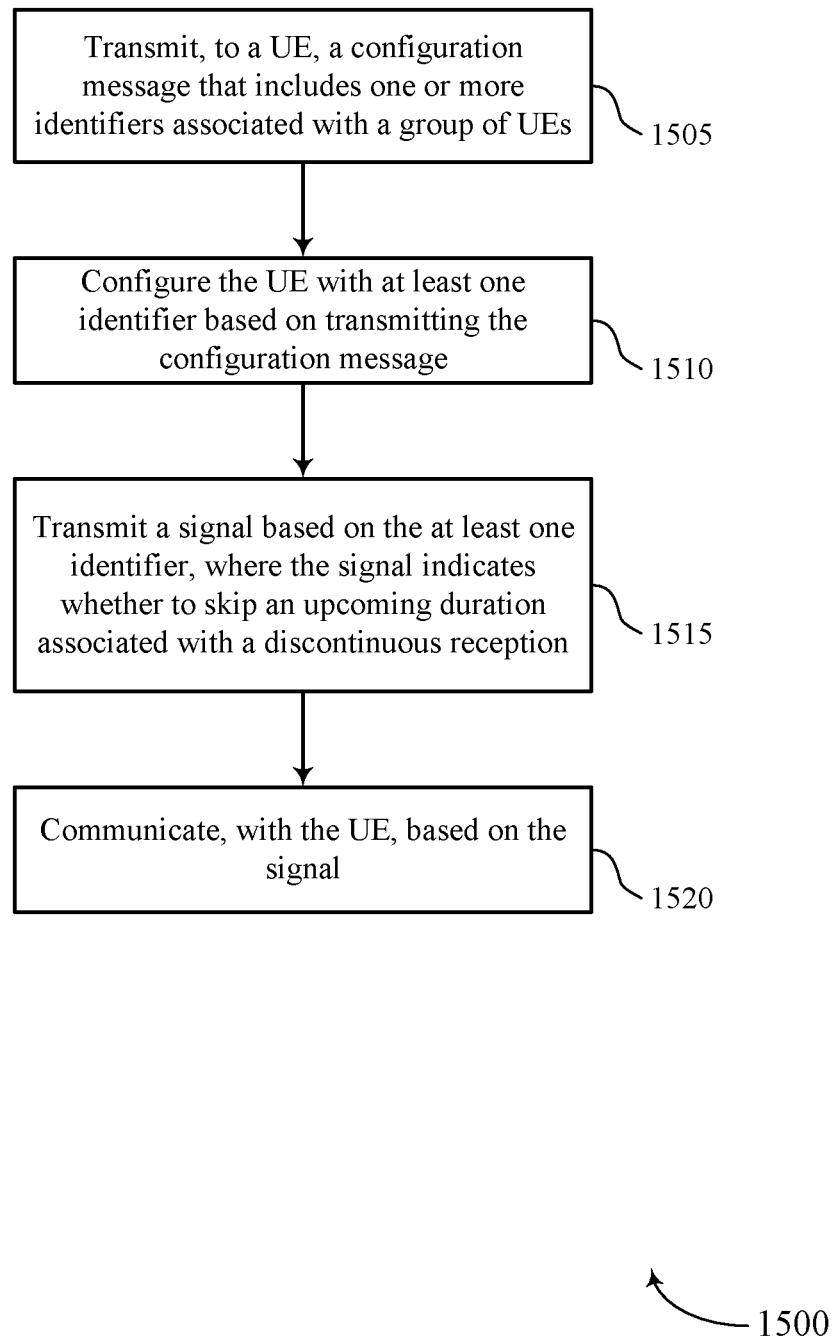

FIG. 15 shows a flowchart illustrating a method 1500 that supports monitoring wake-up signal using common identifier in accordance with aspects of the present disclosure. The operations of method 1500 may be implemented by a base station 105 or its components as described herein. For example, the operations of method 1500 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1505, the base station may transmit, to a UE, a configuration message that includes one or more identifiers associated with a group of UEs. The operations of 1505 may be performed according to the methods described herein. In some examples, aspects of the operations of 1505 may be performed by a configuration message component as described with reference to FIGS. 9 through 12.

At 1510, the base station may configure the UE with at least one identifier based on transmitting the configuration message. The operations of 1510 may be performed according to the methods described herein. In some examples, aspects of the operations of 1510 may be performed by an identifier component as described with reference to FIGS. 9 through 12.

At 1515, the base station may transmit a signal based on the at least one identifier, where the signal indicates whether to skip an upcoming duration associated with a discontinuous reception. The operations of 1515 may be performed according to the methods described herein. In some examples, aspects of the operations of 1515 may be performed by a signal transmission component as described with reference to FIGS. 9 through 12.

At 1520, the base station may communicate, with the UE, based on the signal. The operations of 1520 may be performed according to the methods described herein. In some examples, aspects of the operations of 1520 may be performed by a communication component as described with reference to FIGS. 9 through 12.

Figure 16:
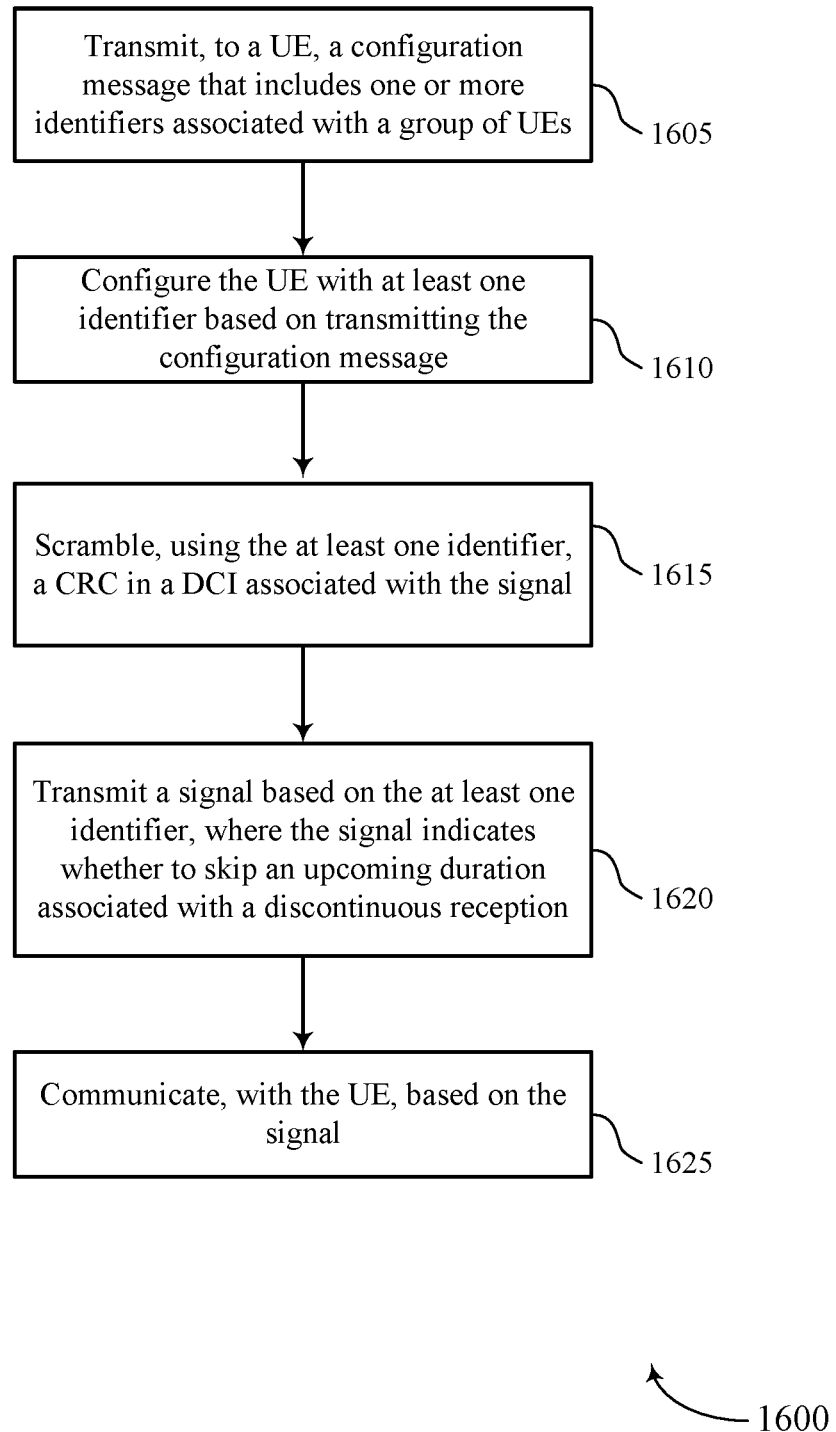

FIG. 16 shows a flowchart illustrating a method 1600 that supports monitoring wake-up signal using common identifier in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station may transmit, to a UE, a configuration message that includes one or more identifiers associated with a group of UEs. The operations of 1605 may be performed according to the methods described herein. In some examples, aspects of the operations of 1605 may be performed by a configuration message component as described with reference to FIGS. 9 through 12.

At 1610, the base station may configure the UE with at least one identifier based on transmitting the configuration message. The operations of 1610 may be performed according to the methods described herein. In some examples, aspects of the operations of 1610 may be performed by an identifier component as described with reference to FIGS. 9 through 12.

At 1615, the base station may scramble, using the at least one identifier, a CRC in a DCI associated with the signal, where transmitting the signal further including transmitting the signal including the scrambled CRC. The operations of 1615 may be performed according to the methods described herein. In some examples, aspects of the operations of 1615 may be performed by a scrambling component as described with reference to FIGS. 9 through 12.

At 1620, the base station may transmit a signal based on the at least one identifier, where the signal indicates whether to skip an upcoming duration associated with a discontinuous reception. The operations of 1620 may be performed according to the methods described herein. In some examples, aspects of the operations of 1620 may be performed by a signal transmission component as described with reference to FIGS. 9 through 12.

At 1625, the base station may communicate, with the UE, based on the signal. The operations of 1625 may be performed according to the methods described herein. In some examples, aspects of the operations of 1625 may be performed by a communication component as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as CDMA, TDMA, FDMA, OFDMA, single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on." In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving, from a base station, a configuration message that includes one or more identifiers associated with a group of UEs;
   determining at least one identifier to use in monitoring a signal based at least in part on receiving the configuration message;
   receiving a downlink control information (DCI) associated with the signal based at least in part on the at least one identifier, wherein the signal comprises at least one bit of the bit mask corresponding to the UE, and wherein a value of the at least one bit indicates whether to skip an upcoming duration associated with a discontinuous reception based at least in part on a bit mask corresponding to the UE;
   analyzing content of the DCI to identify the bit mask associated with one or more intended recipients of the signal;
   determining whether to monitor a second signal based at least in part on the bit mask, wherein monitoring the second signal is based at least in part on determining that the UE is included in the one or more intended recipients; and
   communicating, with the base station, based at least in part on monitoring the signal and the second signal.

2. The method of claim 1, further comprising:
   determining that a cyclic redundancy check (CRC) in the DCI associated with the signal is scrambled using the at least one identifier, wherein monitoring the signal is based at least in part on the determining.

3. The method of claim 2, wherein the at least one identifier is a wake-up signal radio network temporary identifier (RNTI), wherein monitoring the signal further comprises monitoring a wake-up signal based at least in part on the wake-up signal RNTI.

4. The method of claim 3, wherein the wake-up signal RNTI is same for the group of UEs.

5. The method of claim 1, wherein the bit mask indicates whether to skip the upcoming duration associated with the discontinuous reception.

6. The method of claim 1, further comprising:
   determining a demodulation reference signal (DMRS) scrambling seed associated with the signal, wherein monitoring the signal is based at least in part on determining the DMRS scrambling seed.

7. The method of claim 2, wherein the at least one identifier is a cell radio network temporary identifier (C-RNTI), wherein monitoring the signal further comprises monitoring a wake-up signal based at least in part on the C-RNTI.

8. The method of claim 7, wherein the C-RNTI is uniquely associated with the UE.

9. The method of claim 1, further comprising:
   determining that the UE is not configured with a first indicator based at least in part on the configuration message, wherein monitoring the signal further comprises monitoring the signal based at least in part on a second identifier, and wherein the first indicator is a wake-up signal radio network temporary identifier (RNTI) and the second identifier is a cell RNTI (C-RNTI).

10. The method of claim 1, further comprising:
    determining a second identifier based at least in part on receiving the configuration message, wherein the at least one identifier is a wake-up signal radio network temporary identifier (RNTI) and the second identifier is a cell RNTI (C-RNTI).

11. The method of claim 10, wherein monitoring the signal further comprises:
    monitoring a first wake-up signal based at least in part on the at least one identifier; and
    monitoring a second wake-up signal based at least in part on the second identifier.

12. The method of claim 11, wherein monitoring the first wake-up signal and the second wake-up signal occurs during a monitoring occasion.

13. The method of claim 11, wherein monitoring the first wake-up signal and the second wake-up signal occurs during different monitoring occasions.

14. The method of claim 1, wherein the signal is a physical downlink control channel (PDCCH)-based wake-up signal.

15. The method of claim 1, wherein the configuration message is a radio resource control (RRC) configuration message.

16. The method of claim 1, wherein the group of UEs comprise one or more UEs.

17. A method for wireless communication at a base station, comprising:
    transmitting, to a user equipment (UE), a configuration message that includes one or more identifiers associated with a group of UEs;
    configuring the UE to select, from the set of identifiers, at least one identifier to use in monitoring a signal based at least in part on transmitting the configuration message;
    transmitting a downlink control information (DCI) associated with the signal, wherein a content of the DCI identifies a bit mask associated with one or more intended recipients of the signal;
    configuring the UE to determine whether to monitor a second signal based at least in part on the bit mask, wherein monitoring the second signal is based at least in part on determining that the UE is included in the one or more intended recipients;
    transmitting the signal based at least in part on the at least one identifier, wherein the signal comprises at least one bit of the bit mask corresponding to the UE, and wherein a value of the at least one bit indicates whether to skip an upcoming duration associated with a discontinuous reception based at least in part on the bit mask corresponding to the UE; and
    communicating, with the UE, based at least in part on the signal and the second signal.

18. The method of claim 17, further comprising:
    scrambling, using the at least one identifier, a cyclic redundancy check (CRC) in the DCI associated with the signal, wherein transmitting the signal further comprising transmitting the signal including the scrambled CRC.

19. The method of claim 18, wherein the at least one identifier is a wake-up signal radio network temporary identifier (RNTI), wherein transmitting the signal further comprises transmitting a wake-up signal based at least in part on the wake-up signal RNTI.

20. The method of claim 19, wherein the wake-up signal RNTI is same for the group of UEs.

21. The method of claim 18, wherein the at least one identifier is a cell radio network temporary identifier (C-RNTI), wherein transmitting the signal further comprises transmitting a wake-up signal based at least in part on the C-RNTI.

22. The method of claim 21, wherein the C-RNTI is uniquely associated with the UE.

23. The method of claim 17, further comprising:
configuring the UE with a second identifier based at least in part on transmitting the configuration message, wherein the at least one identifier is a wake-up signal radio network temporary identifier (RNTI) and the second identifier is a cell RNTI (C-RNTI).

24. The method of claim 23, wherein transmitting the signal further comprises:
transmitting a first wake-up signal based at least in part on the at least one identifier; and
transmitting a second wake-up signal based at least in part on the second identifier.

25. The method of claim 17, wherein the signal is a physical downlink control channel (PDCCH)-based wake-up signal.

26. The method of claim 17, wherein the configuration message is a radio resource control (RRC) configuration message.

27. An apparatus for wireless communication at a user equipment (UE), comprising: a processor, memory in communication with the processor; and
instructions stored in the memory, the instructions being executable by the processor to:
receive, from a base station, a configuration message that includes one or more identifiers associated with a group of UEs;
determine at least one identifier to use in monitoring a signal based at least in part on receiving the configuration message;
receive a downlink control information (DCI) associated with the signal based at least in part on the at least one identifier, wherein the signal comprises at least one bit of the bit mask corresponding to the UE, and wherein a value of the at least one bit indicates whether to skip an upcoming duration associated with a discontinuous reception based at least in part on a bit mask corresponding to the UE;
analyze content of the DCI to identify a bit mask associated with one or more intended recipients of the signal;
determine whether to monitor a second signal based at least in part on the bit mask, wherein monitoring the second signal is based at least in part on determining that the UE is included in the one or more intended recipients; and
communicate, with the base station, based at least in part on monitoring the signal and the second signal.

28. An apparatus for wireless communication at a base station, comprising: a processor, memory in electronic communication with the processor; and instructions stored in the memory, the instructions being executable by the processor to:
transmit, to a user equipment (UE), a configuration message that includes one or more identifiers associated with a group of UEs;
configure the UE to select, from the set of identifiers, at least one identifier to use in monitoring a signal based at least in part on transmitting the configuration message;
transmit a downlink control information (DCI) associated with the signal, wherein a content of the DCI identifies a bit mask associated with one or more intended recipients of the signal;
configure the UE to determine whether to monitor a second signal based at least in part on the bit mask, wherein monitoring the second signal is based at least in part on determining that the UE is included in the one or more intended recipients;
transmit the signal based at least in part on the at least one identifier, wherein the signal comprises at least one bit of the bit mask corresponding to the UE, and wherein a value of the at least one bit indicates whether to skip an upcoming duration associated with a discontinuous reception based at least in part on the bit mask corresponding to the UE; and
communicate, with the UE, based at least in part on the signal and the second signal.

* * * * *